(12) United States Patent
Satoh et al.

(10) Patent No.: US 7,616,350 B2
(45) Date of Patent: Nov. 10, 2009

(54) DATA COMMUNICATION APPARATUS AND METHOD

(75) Inventors: Kazuhiro Satoh, Kanagawa (JP); Tetsuya Kagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 827 days.

(21) Appl. No.: 10/246,037

(22) Filed: Sep. 18, 2002

(65) Prior Publication Data

US 2003/0081263 A1    May 1, 2003

(30) Foreign Application Priority Data

Sep. 21, 2001    (JP)    ............... 2001-289254
Sep. 25, 2001    (JP)    ............... 2001-290423
Jul. 23, 2002    (JP)    ............... 2002-213800

(51) Int. Cl.
H04N 1/00      (2006.01)

(52) U.S. Cl. ................. 358/425; 358/401; 358/409; 358/412; 358/468

(58) Field of Classification Search ............ 358/412, 358/401, 409, 425, 468
See application file for complete search history.

(56) References Cited

U.S. PATENT DOCUMENTS

| | | | |
|---|---|---|---|
| 4,646,160 A | | 2/1987 | Iizuka et al. |
| 5,019,916 A | * | 5/1991 | Ogura ................ 358/401 |
| 5,055,945 A | | 10/1991 | Oguma et al. |
| 5,095,373 A | | 3/1992 | Hisano et al. |
| 5,097,187 A | | 3/1992 | Koshiishi et al. |
| 5,134,502 A | * | 7/1992 | Nakatsuma ............ 358/440 |
| 5,426,645 A | * | 6/1995 | Haskin ................ 370/477 |
| 5,452,474 A | | 9/1995 | Kagawa |
| 5,597,311 A | | 1/1997 | Yanagida et al. |
| 5,608,545 A | | 3/1997 | Kagawa |
| 5,644,405 A | * | 7/1997 | Sato ................... 358/404 |
| 5,721,766 A | * | 2/1998 | Yoshino et al. ......... 379/401 |
| 5,754,745 A | | 5/1998 | Sato |
| 5,775,918 A | | 7/1998 | Yanagida et al. |
| 5,825,992 A | | 10/1998 | Satoh |

(Continued)

FOREIGN PATENT DOCUMENTS

EP    0337772 A2    10/1989

(Continued)

OTHER PUBLICATIONS

U.S. Appl. No. 09/978,754, filed Oct. 16, 2001.

(Continued)

*Primary Examiner*—Twyler M. Lamb
*Assistant Examiner*—Benjamin O Dulaney
(74) *Attorney, Agent, or Firm*—Cooper & Dunham, LLP

(57) ABSTRACT

A data communication apparatus is provided with an image reader which reads a document image, a storage which stores image data of the document image read by the image reader and registers one or a plurality of transmitting destinations, a data communication unit having a plurality of communication lines, and a communication control unit which controls a transmission start timing of the image data to the transmitting destinations. The communication control unit controls the data communication unit to start transmitting the image data to a first transmitting destination at a timing when reading of the document image by the image reader starts, when a plurality of transmitting destinations are registered.

19 Claims, 26 Drawing Sheets

U.S. PATENT DOCUMENTS

| | | | |
|---|---|---|---|
| 5,987,274 A | 11/1999 | Satoh | |
| 5,995,239 A | 11/1999 | Kagawa et al. | |
| 6,005,671 A * | 12/1999 | Ishikawa | 358/407 |
| 6,160,637 A | 12/2000 | Kagawa | |
| 6,222,645 B1 | 4/2001 | Kagawa | |
| 6,223,226 B1 * | 4/2001 | Miyahara | 709/241 |
| 6,248,996 B1 * | 6/2001 | Johnson et al. | 250/234 |
| 6,377,357 B1 * | 4/2002 | Sato et al. | 358/1.15 |
| 6,611,355 B1 * | 8/2003 | Kizawa | 358/1.9 |
| 6,876,469 B1 * | 4/2005 | Nakamura | 358/437 |
| 6,947,156 B1 * | 9/2005 | Jeyachandran et al. | 358/1.15 |
| 2001/0017708 A1 * | 8/2001 | Kobayashi et al. | 358/1.13 |
| 2001/0033390 A1 * | 10/2001 | Tonegawa | 358/1.15 |
| 2002/0001378 A1 * | 1/2002 | Ooi | 379/221.01 |

FOREIGN PATENT DOCUMENTS

| | | |
|---|---|---|
| JP | 63036651 | 2/1988 |
| JP | 9-9030 | 1/1997 |
| JP | 9-107429 | 4/1997 |
| JP | 2000-236427 | 8/2000 |
| JP | 2001-156938 | 6/2001 |

OTHER PUBLICATIONS

U.S. Appl. No. 10/013,232, filed Dec. 10, 2001.
U.S. Appl. No. 09/881,402, filed Jun. 14, 2001.
U.S. Appl. No. 09/301,134, filed Apr. 28, 1999.

* cited by examiner

《PROCESS D》

FIG.14
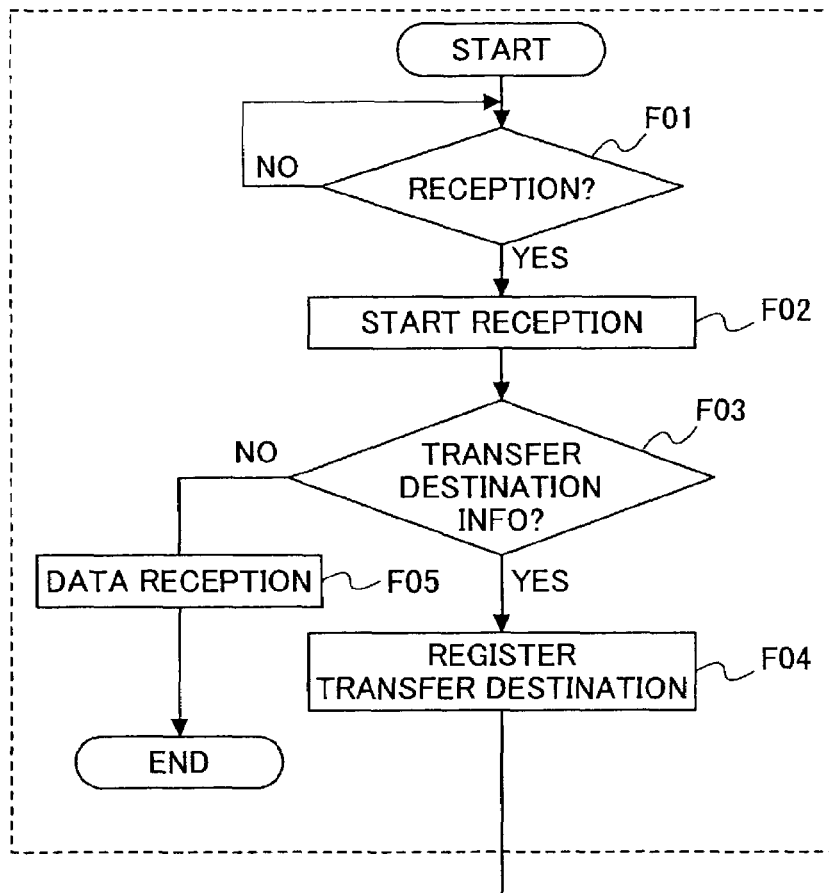
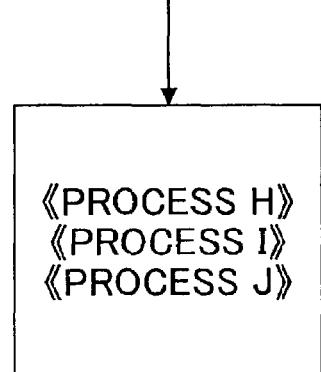

《PROCESS L》

《PROCESS N》

《PROCESS O》

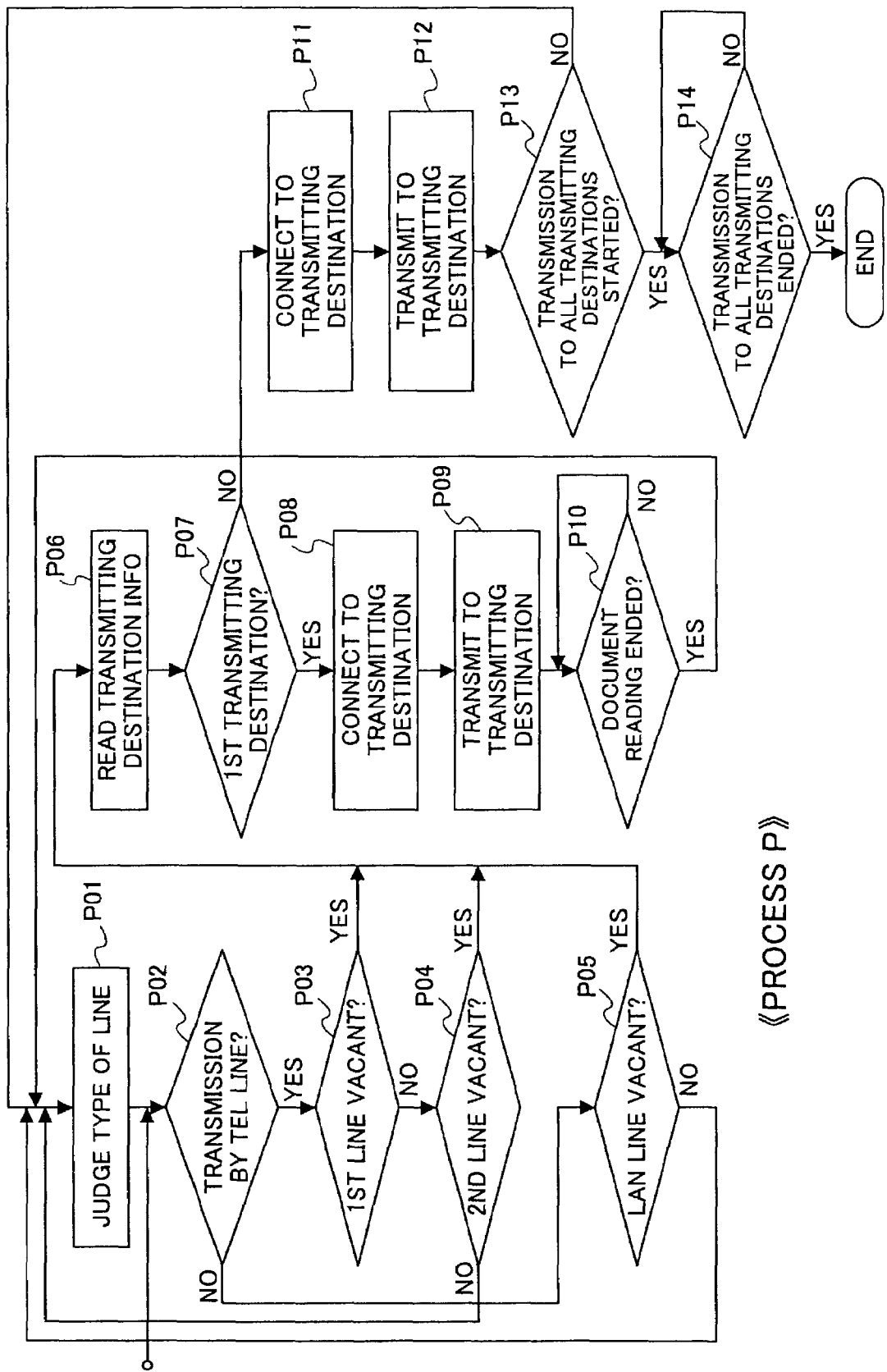

DATA COMMUNICATION APPARATUS AND METHOD

This application claims the benefit of Japanese Patent Applications No. 2001-289254 filed Sep. 21, 2001, No. 2001-290423 filed Sep. 25, 2001 and No. 2002-213800 filed Jul. 23, 2002, in the Japanese Patent Office, the disclosures of which are hereby incorporated by reference.

BACKGROUND OF THE INVENTION

1. Field of the Invention

The present invention generally relates to data communication apparatuses and methods, and more particularly to a data communication apparatus, such as a facsimile apparatus and an Internet facsimile apparatus, capable of reducing a transmission time when carrying out a broadcast transmission or broadcast transfer and reducing a loss of communication expenses even when a paper jam or the like occurs, and to a data communication method for making such a data communication.

2. Description of the Related Art

Recently, data communication apparatuses, such as facsimile apparatuses and Internet facsimile apparatuses (hereinafter simply referred to as facsimile apparatuses), which can accommodate a plurality of lines are increasing. The data communication apparatus may accommodate a plurality of lines by an option setting or, accommodate a plurality of lines according to standard specifications. For example, it is possible to add to a facsimile apparatus which is mounted with a communication circuit for a G3 line according to standard specifications, a communication board such as an ISDN G4 board (for 2 lines), a G3 board, a LAN board or the like.

In the facsimile apparatus (hereinafter referred to as a multiple-line facsimile apparatus) which accommodates an plurality of lines by adding the communication board, it is possible to carry out a transmission process in a shorter time compared to the facsimile apparatus (hereinafter referred to as a single-line facsimile apparatus) which only accommodates a single line, when a plurality of transmitting destinations are specified for the same transmitting data (hereinafter referred to as a broadcast plural transmitting destination designation) or when a plurality of transferring destinations are specified for the same transmitting data for memory transfer (hereinafter referred to as a broadcast plural transfer destination designation).

When making the broadcast plural transmitting destination designation in the multiple-line facsimile apparatus, it is possible to employ a sequential broadcast transmission system which successively calls the facsimile apparatuses at the transmitting destinations in an order in which the operator inputs the transmitting destination information such as a telephone number and a network address. However, a simultaneous broadcast transmission system is normally employed to make a simultaneous broadcast transmission when a vacant line is available.

Normally, the facsimile apparatus is provided with a so-called memory transmission function (store-and-forward function). According to the memory transmission function, image data amounting to all pages are stored as a single file within an image data memory before calling a transmitting destination facsimile apparatus, so as to enable quick recovery of a document which is transmitted.

In addition, the facsimile apparatus provided with the memory transmission function may simultaneously start reading the document and calling the transmitting destination facsimile apparatus, so that successive storage of the read document can be started before a connection is established between the facsimile apparatus and the transmitting destination facsimile apparatus. Hence, by successively transmitting the image data which are already stored in the image data memory, it is possible to eliminate a waiting time from a time when the reading of the document starts to a time when the transmission of the read image data starts. In this specification, such a transmission will be referred to as a "quick transmission", and a function of making such a quick transmission will be referred to as a "quick transmission function".

When making the broadcast transmission using the quick transmission function of the single line facsimile apparatus, a quick transmission is made with respect to a first transmitting destination. With respect to second and subsequent transmitting destinations, a plurality of transmitting destination facsimile apparatuses are simultaneously called when a vacant line exists, after storing the image data amounting to all pages of the document into the image data memory.

On the other hand, when a single transmitting destination is specified (hereinafter referred to as a single transmitting destination designation) in the multiple-line facsimile apparatus, a quick transmission is made. In the case of a broadcast plural transmitting destination designation, a quick transmission is not made, and instead, all pages of the document are read and the image data amounting to all pages of the document are stored as a single file within the image data memory, before successively calling the transmitting destination facsimile apparatuses.

When making the broadcast plural transfer destination designation in the multiple-line facsimile apparatus, if the image data transmitted from the transfer source facsimile apparatus is to be transferred to a predesignated transfer destination and a vacant line exists similarly to the case of the broadcast plural transmitting destination designation, the simultaneous broadcast transmission system which simultaneously makes the broadcast transmission is employed. In this case, the multiple-line facsimile apparatus simultaneously calls a plurality of transmitting destination facsimile apparatuses if a vacant line exists, after storing the image data amounting to all pages of the document as a single file within the image data memory.

However, when making the broadcast plural transmitting destination designation in the multiple-line facsimile apparatus, the transmission of the image data is not possible until the image data amounting to all pages are stored as a single file within the image data memory, and there is a problem in that it takes time until the transmission of the image data starts.

Similarly, when making the broadcast plural transfer destination designation in the multiple-line facsimile apparatus, the transfer of the image data is not possible until the image data amounting to all pages are stored as a single file within the image data memory, and there is a problem in that it takes time until the transfer of the image data starts.

In addition, when transmitting to a plurality of transmitting destination facsimile apparatuses the image data while reading the document, the transmission of the image data to the transmitting destination facsimile apparatuses is interrupted in its entirely if a paper jam (including double paper transport in which two or more sheets of paper are erroneously transported together) or a storage capacity of the image data memory becomes insufficient. For this reason, in a case where the paper jam occurs during a transmission to a plurality of transmitting destinations located overseas, for example, such that the communication expenses thereof is high, the above described interruption of the transmission would cause a loss or waste of the high communication expenses.

SUMMARY OF THE INVENTION

Accordingly, it is a general object of the present invention to provide a novel and useful data communication apparatus and method, in which the problems described above are eliminated.

Another and more specific object of the present invention is to provide a data communication apparatus and a data communication method which can reduce a transmission time or a transfer time when making a broadcast transmission or a broadcast transfer, and can carry out an appropriate control even in a state where a transmission becomes impossible, such as a generation of a paper jam, occurs.

Another specific object of the present invention is to provide a data communication apparatus and a data communication method which can suppress a loss or waste of communication expenses to a minimum even in a state where a transmission becomes impossible, such as a generation of a paper jam, occurs, when making a simultaneous broadcast transmission.

Still another object of the present invention is to provide a data communication apparatus comprising an image reader which reads a document image; an image data storage which stores image data of the document image read by the image reader; a transmitting destination storage which registers one or a plurality of transmitting destinations; a data communication unit having a plurality of communication lines; and a communication control unit which controls a transmission start timing of the image data to the transmitting destinations, where the communication control unit controls the data communication unit to start transmitting the image data to a first transmitting destination at a timing when reading of the document image by the image reader starts, when a plurality of transmitting destinations are registered in the transmitting destination storage. According to the data communication apparatus of the present invention, it is possible to simultaneously transmit the image data to the transmitting destinations even when making the transmission while reading the document (during quick transmission), by appropriately setting the transmitting timing. Hence, it is possible to reduce the transmission time when making the broadcast plural transmitting destination designation. In addition, even if the transmission stops during the reading of the document due to some reason such as a paper jam, it is possible to suppress the undesirable effects thereof. Furthermore, since the transmission to the second transmitting destination is started simultaneously as the end of reading the document, without having to wait for the transmission to the first transmitting destination to end, it is possible to further reduce the transmission time.

The communication control unit may start transmitting the image data to second and subsequent transmitting destinations at one of first and second timings when a plurality of transmitting destinations are registered in the transmitting destination storage, where the first timing is simultaneous to a transmission of the image data to the first transmitting destination or before the transmission of the image data to the first transmitting destination ends, and the second timing is after the transmission of the image data to the first transmitting destination ends. In this case, when making the transmission to the second transmitting destination after the transmission to the first transmitting destination ends, it is possible to effectively reduce the time until the transmission to all of the transmitting destinations to end by first transmitting to the transmitting destination having the higher communication rate. A program which determines the transmitting destination having the highest communication rate based on statistics such as past communication logs, may be stored in a system memory or the like, and in this case, the transmitting destination to which the transmission is to be made first can be determined by this program. In addition, it is also possible to first make the transmission to the transmitting destination which the user judges as having the highest communication rate.

The communication control unit may control the data communication unit to start transmitting the image data to second and subsequent transmitting destinations at one of first through third timings when a plurality of transmitting destinations are registered in the transmitting destination storage, where the first timing is after reading of the document image by the image reader ends, the second timing is after reading of a first page or a predetermined page which is one of second and subsequent pages of the document by the image reader ends, and the third timing is arbitrarily specified by a user.

The data communication apparatus may further comprise a transmission mode selection unit which selects a transmission mode in which the communication control unit controls the data communication unit to start transmitting the image data to second and subsequent transmitting destinations at one of first through fourth timings when a plurality of transmitting destinations are registered in the transmitting destination storage, where the first timing is simultaneous to a transmission of the image data to the first transmitting destination or before the transmission of the image data to the first transmitting destination ends, the second timing is after the transmission of the image data to the first transmitting destination ends, the third timing is after reading of the document by the image reader ends, and the fourth timing is after reading of a first page or a predetermined page which is one of second and subsequent pages of the document by the image reader ends. It is possible to cope with various transmission requests, by making it possible for the user to appropriately set the transmission timing.

The data communication apparatus may further comprise an inexpensive transmitting destination searching unit which searches for a transmitting destination requiring an arbitrary low communication charge per unit time, so that the transmitting destination requiring the arbitrary low communication charge is set as the first transmitting destination, when a plurality of transmitting destinations are registered in the transmitting destination storage.

The data communication apparatus may further comprise a first transmitting destination specifying unit which specifies the first transmitting destination when a plurality of transmitting destinations are registered in the transmitting destination storage.

The data communication apparatus may further comprise means for automatically determining the first transmitting destination when a plurality of transmitting destinations are registered in the transmitting destination storage.

The data communication apparatus may further comprise a local number storage which stores local numbers of the transmitting destinations, where the inexpensive transmitting destination searching unit searching for the transmitting destination requiring the arbitrary low communication charge based on the local numbers stored in the local number storage.

The data communication apparatus may further comprise a charge table which stores communication charges per unit time with respect to the transmitting destinations, where the inexpensive transmitting destination searching unit searching for the transmitting destination requiring the arbitrary low communication charge based on the communication charges per unit time stored in the charge table.

The inexpensive transmitting destination searching unit may search for the transmitting destination requiring the arbitrary low communication charge based on whether the transmitting destination is identified by a telephone number of a mail address.

Therefore, according to the data communication apparatus described above, after the reading of the document by the image reader ends, it is possible to make the transmission to the second transmitting destination at a timing after the reading of the first page or the predetermined page of the second and subsequent pages by the image reader ends. Since a paper jam is likely to occur at the first page, this transmission technique is particularly effective against the paper jam. Moreover, when reading a special document such as thick paper or paper made of a special material, it is possible to take measures so that the transmission to the second transmitting destination is not made until the page of this special document.

A further object of the present invention is to provide a data communication apparatus comprising a data communication unit having a plurality of communication lines for receiving and transmitting data; an image data storage which stores data received by the data communication unit; a transfer destination storage which registers one or a plurality of transfer destinations; and a communication control unit which controls transmission of the data communication unit when a plurality of transfer destinations are registered in the transfer destination storage, so that the communication control unit starts transfer control of the data received by the data communication unit to a first transfer destination at a timing when data reception of the data communication unit starts, and starts transfer control of the data received by the data communication unit to a plurality of transfer destinations at a timing after the data reception of the data communication unit ends. In other words, the transmission start timing of the present invention is not limited to the transmission of the image data read by the image reader (scanner), but is also applicable to the transmission of the image data received by a facsimile apparatus or the like.

The communication control unit may control the data communication unit to start transmitting the image data stored in the image data storage to second and subsequent transfer destinations at one of first through fifth timings when a plurality of transfer destinations are registered in the transfer destination storage, the data reception of the data communication unit starts and transmission of the image data to a first transfer destination starts, where the first timing is simultaneous to the transmission of the image data to the first transfer destination or before the transmission of the image data to the first transfer destination ends, the second timing is after the transmission of the image data to the first transfer destination ends, the third timing is after the data reception of the data communication unit ends, the fourth timing is after reception of a first page or a predetermined page which is one of second and subsequent pages of a document by the data communication unit ends, and the fifth timing is arbitrarily specified by a user.

The data communication apparatus may further comprise a transmission mode selection unit which selects a transmission mode in which the communication control unit controls the data communication unit to start transmitting the image data to second and subsequent transfer destinations at one of first through fourth timings when a plurality of transfer destinations are registered in the transfer destination storage, where the first timing is before the transmission of the image data to the first transfer destination ends, the second timing is after the transmission of the image data to the first transfer destination ends, the third timing is after the data reception by the data communication unit ends, and the fourth timing is after reception of a first page or a predetermined page which is one of second and subsequent pages of a document by the data communication unit ends.

Therefore, according to the latter described data communication apparatus, it is possible to simultaneously transmit the image data to the transfer destinations even when making the transmission while receiving the image data, by appropriately setting the transmitting timing. Hence, it is possible to reduce the transmission time when making the broadcast plural transfer destination designation. In addition, even if the transmission stops during the reception of the image data due to some reason such as a data reception error, it is possible to suppress the undesirable effects thereof. Furthermore, since the transmission to the second transfer destination is started simultaneously as the end of reception of the document, without having to wait for the transmission to the first transfer destination to end, it is possible to further reduce the transmission time. Moreover, even if an error occurs during the data reception, it is possible to prevent the pages up to the page where the error occurred from being transferred. It is also possible to cope with various transfer requests, by making it possible for the user to appropriately set the transmission timing.

Another object of the present invention is to provide a data communication apparatus comprising image reading means for reading a document image; image data storage means for storing image data of the document image read by the image reading means; transmitting destination storage means for registering one or a plurality of transmitting destinations; data communication means having a plurality of communication lines; and communication control means for controlling a transmission start timing of the image data to the transmitting destinations, where the communication control means controls the data communication unit to start transmitting the image data to a first transmitting destination at a timing when reading of the document image by the image reading means starts, when a plurality of transmitting destinations are registered in the transmitting destination storage means. According to the data communication apparatus of the present invention, it is possible to simultaneously transmit the image data to the transmitting destinations even when making the transmission while reading the document (during quick transmission), by appropriately setting the transmitting timing. Hence, it is possible to reduce the transmission time when making the broadcast plural transmitting destination designation. In addition, even if the transmission stops during the reading of the document due to some reason such as a paper jam, it is possible to suppress the undesirable effects thereof. Furthermore, since the transmission to the second transmitting destination is started simultaneously as the end of reading the document, without having to wait for the transmission to the first transmitting destination to end, it is possible to further reduce the transmission time.

Still another object of the present invention is to provide a data communication apparatus comprising data communication means having a plurality of communication lines for receiving and transmitting data; image data storage means for storing data received by the data communication means; transfer destination storage means for registering one or a plurality of transfer destinations; and communication control means for controlling transmission of the data communication means when a plurality of transfer destinations are registered in the transfer destination storage means, so that the communication control means starts transfer control of the data received by the data communication means to a first transfer destination at a timing when data reception of the data communication unit starts, and starts transfer control of the data received by the data communication means to a plurality of transfer destinations at a timing after the data reception of the data communication means ends. In other words, the transmission start timing of the present invention is not limited to the transmission of the image data read by the image reader (scanner), but is also applicable to the transmission of the image data received by a facsimile apparatus or the like.

A further object of the present invention is to provide a data communication method comprising reading a document image; storing image data of the read document image; registering one or a plurality of transmitting destinations; and controlling a transmission start timing of the image data to the transmitting destinations, by controlling a data communication unit having a plurality of communication lines to start transmitting the image data to a first transmitting destination at a timing when reading of the document image starts, when a plurality of transmitting destinations are registered. According to the data communication method of the present invention, it is possible to simultaneously transmit the image data to the transmitting destinations even when making the transmission while reading the document (during quick transmission), by appropriately setting the transmitting timing. Hence, it is possible to reduce the transmission time when making the broadcast plural transmitting destination designation. In addition, even if the transmission stops during the reading of the document due to some reason such as a paper jam, it is possible to suppress the undesirable effects thereof. Furthermore, since the transmission to the second transmitting destination is started simultaneously as the end of reading the document, without having to wait for the transmission to the first transmitting destination to end, it is possible to further reduce the transmission time.

Another object of the present invention is to provide a data communication method comprising controlling transmission of a data communication unit which has a plurality of communication lines for receiving and transmitting data when a plurality of transfer destinations are registered in a transfer destination storage, so that the communication control unit starts transfer control of the data received by the data communication unit to a first transfer destination at a timing when data reception of the data communication unit starts, and starts transfer control of the data received by the data communication unit to a plurality of transfer destinations at a timing after the data reception of the data communication unit ends. In other words, the transmission start timing of the present invention is not limited to the transmission of the image data read by the image reader (scanner), but is also applicable to the transmission of the image data received by a facsimile apparatus or the like.

Other objects and further features of the present invention will be apparent from the following detailed description when read in conjunction with the accompanying drawings.

BRIEF DESCRIPTION OF THE DRAWINGS

FIG. 14 is a flow chart for explaining a process F carried out prior to transmission to a transfer destination together with an image reading process G;

FIG. 26 is a flow chart for explaining a broadcast transmission process.

DESCRIPTION OF THE PREFERRED EMBODIMENTS

Figure 1:
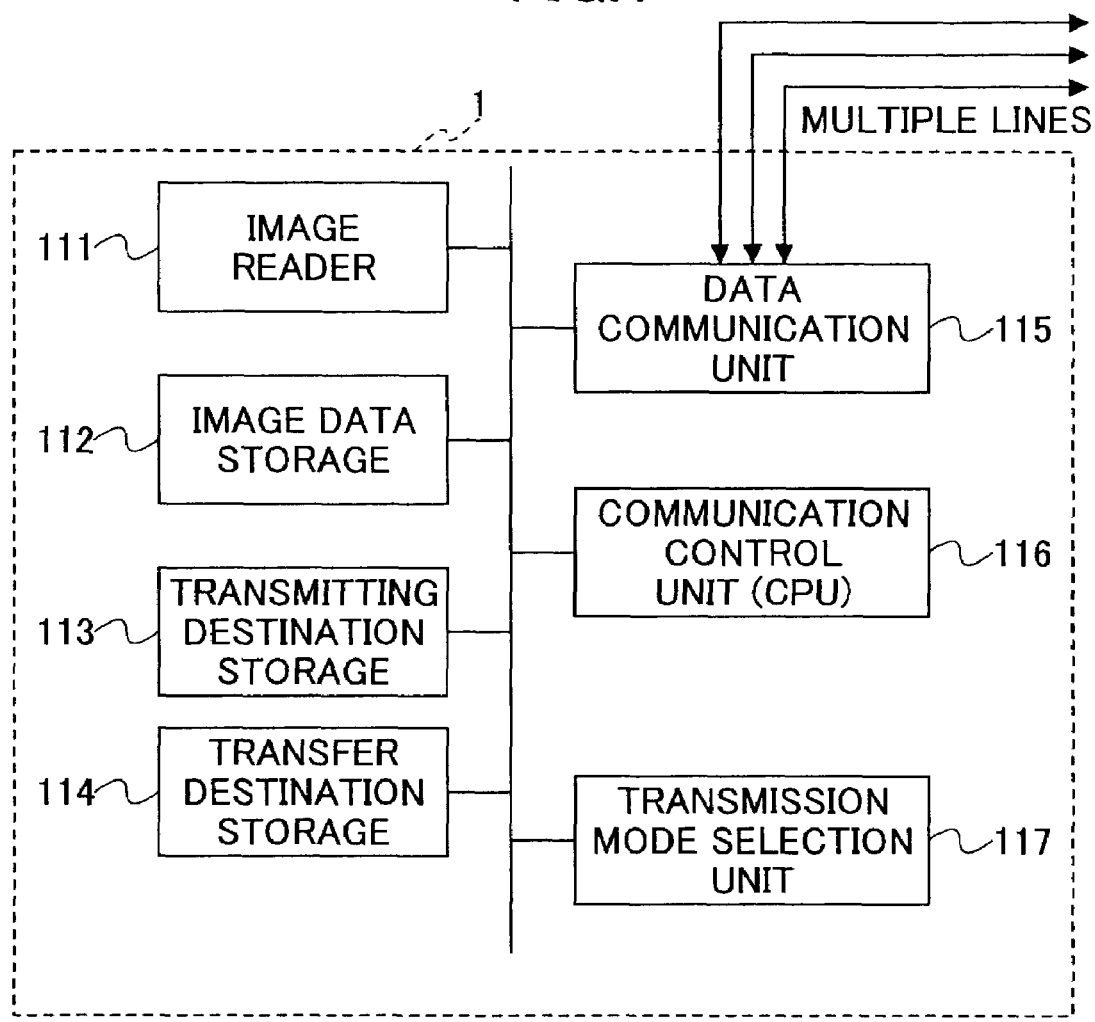
FIG. 1 is a functional block diagram showing a first embodiment of a data communication apparatus according to the present invention.

FIG. 1 is a functional block diagram showing a first embodiment of a data communication apparatus according to the present invention. This first embodiment of the data communication apparatus employs a first embodiment of a data communication method according to the present invention. A facsimile apparatus 1 shown in FIG. 1 includes an image reader 111, an image data storage 112, a transmitting destination storage 113, a transfer destination storage 114, a data communication unit 115, a communication control unit 116, and a transmission mode selection unit 117. The user selects a transmission mode to be employed by the facsimile apparatus 1 via the transmission mode selection unit 117.

In this embodiment, the communication control unit 116 controls the data communication unit 115 to start transmission of image data stored in the image data storage 112 to second and subsequent transmitting destinations at any of the following timings when a plurality of transmitting destinations are registered in the transmitting destination storage 113.

(1-1) A timing which is the same as (simultaneous to) a transmission of the image data to a first transmitting destination or, before this transmission ends;

(1-2) A timing after the transmission of the image data to the first transmitting destination ends; and (1-3) A timing after reading by the image reader 111 ends.

Any storage or memory means capable of storing information may be used for the image data storage 112, the transmitting destination storage 113 and the transfer destination storage 114. A single storage or memory means may be used for the image data storage 112, the transmitting destination storage 113 and the transfer destination storage 114. Alternatively, separate storage or memory means may be used for some or all of the image data storage 112, the transmitting destination storage 113 and the transfer destination storage 114.

Figure 2:
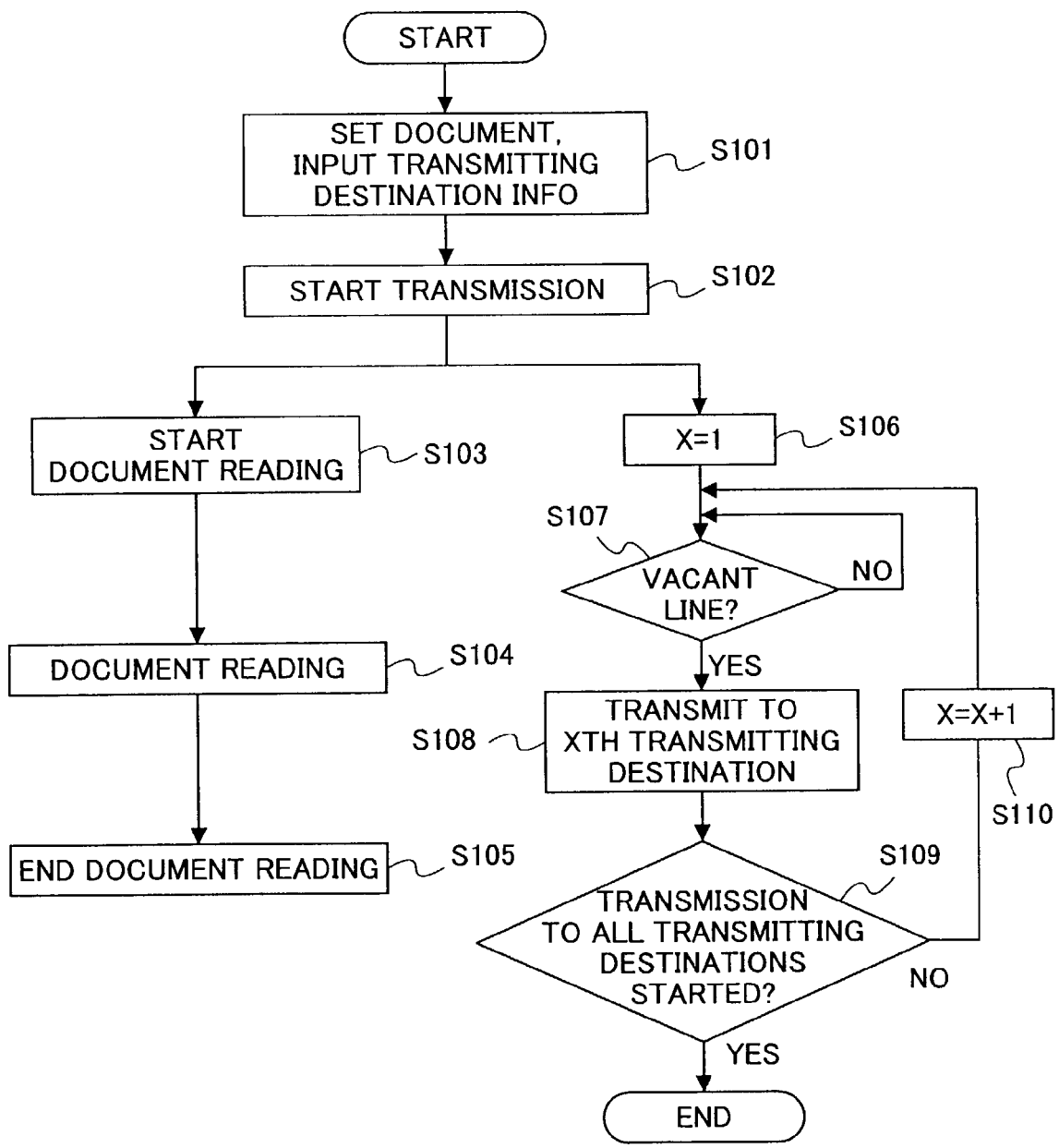
FIG. 2 is a flow chart for explaining a transmission at a timing which is the same as a transmission of image data to a first transmitting destination or before this transmission ends.

Next, a description will be given of the operation, that is, steps S101 through S110 shown in FIG. 2, of the facsimile apparatus 1 when making the transmission at the above described timing (1-1). FIG. 2 is a flow chart for explaining the transmission at the timing (1-1) which is the same as the transmission of the image data to the first transmitting destination or before this transmission ends.

First, in the step S101, a document is set in the image reader 111, and a plurality of transmitting destination information N1 through Nk, including telephone numbers, network addresses or the like, are input using an operation section (not shown) such as an operation panel. When a transmission start button of the operation section is pushed, a transmission start instruction is sent to the communication control unit 116 in the step S102. In the step S103, the image reader 111 starts reading the document, and the document image is stored in the image data storage 112 in the order read. In FIG. 2, the step S104 carries out a process during the reading of the document, and the step S105 carries out a process of ending the reading of the document.

Simultaneously as the start of the process of the step S103, the communication control unit 116 checks whether or not a vacant line capable of transmitting to one of the transmitting destinations is available in the step S107. In other words, a check is made to determine whether or not a telephone line or a LAN line is vacant, depending on whether the transmitting destination information is the telephone number or the Internet address (mail address). Although not shown in FIG. 2, the above described check includes a loop search for checking whether or not the transmission has been made or the transmission is not yet made, with respect to the transmitting destination information N1 through Nk, and for checking whether or not a corresponding line is vacant with respect to the transmitting destination which has not yet been searched, as will be described later. This checking is similar for a step S206 shown in FIG. 3, a step S306 shown in FIG. 4, a step S407 shown in FIG. 5, a step S506 shown in FIG. 6, a step S606 shown in FIG. 7 and a step S708 shown in FIG. 8 which will be described later.

If a predetermined vacant line does not exist, a vacant line is waited. On the other hand, if a vacant line exists and the decision result in the step S107 is YES, the process advances to the step S108 which starts a transmission to an Xth transmitting destination. Before the step S107 is carried out, X is initialized to X=1 in the step S106.

After the transmission to the Xth transmitting destination starts, the communication control unit 116 checks whether or not the transmission to all of the transmitting destinations started, in the step S109. More particularly, X and k are compared to determine whether or not the transmission is started to all of the transmitting destinations. If X<k and the decision result in the step S109 is NO, X is incremented to X=X+1 in the step S110, and the process returns to the step S107. On the other hand, if the decision result in the step S109 is YES, the process ends after waiting for the transmission to all of the transmitting destinations to end.

During the reading of the document in the step S104 shown in FIG. 2, the user may wish to stop reading the document by pushing a stop key of the operation section or, a read error may occur, while the transmission is being made to the plurality of transmitting destinations. The read error may be a paper jam generated during the reading of the document, lack of storage capacity in the image data storage 112 or the like. In such cases, an error will be generated in all of the lines connected in this state. As a result, the communication expenses of the interrupted transmissions become high, and it also becomes necessary to take measures to request the transmitting destinations to destroy the incompletely received transmissions of the document.

Figure 3:
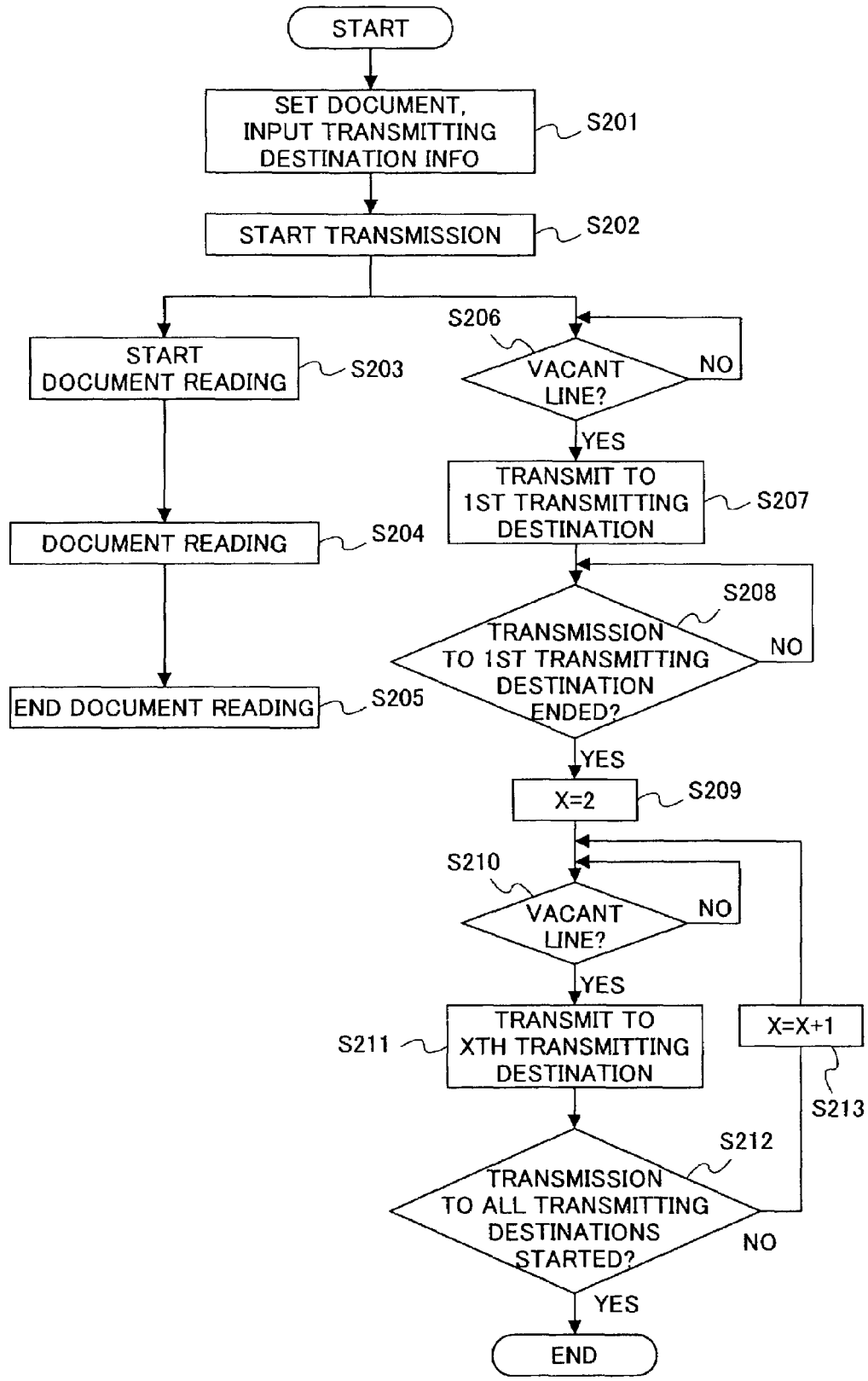
FIG. 3 is a flow chart for explaining a transmission at a timing after the transmission of the image data to the first transmitting destination.

These inconveniences can be eliminated by making the transmission at the above described timing (1-2). A description will be given of the operation, that is, steps S201 through S213 shown in FIG. 3, of the facsimile apparatus 1 when making the transmission at the above described timing (1-2). FIG. 3 is a flow chart for explaining the transmission at the timing (1-2) after the transmission of the image data to the first transmitting destination.

The process of the steps S201 through S205 from the setting of the document to the image reader 111, the inputting of the transmitting destination information N1 through Nk, and ending of the reading of the document, is the same as that of the steps S101 through S105 shown in FIG. 2.

Simultaneously as the start of the process of the step S203, the communication control unit 116 checks whether or not a vacant line capable of transmitting to one of the transmitting destinations is available in the step S206. If a vacant line does not exist, a vacant line is waited. On the other hand, if a vacant line exists and the decision result in the step S206 is YES, the process advances to the step S207 which starts a transmission to the first transmitting destination.

After the transmission to the first transmitting destination starts, the communication control unit 116 checks whether or not the transmission by the data communication unit 115 ended, in the step S208. If the decision result in the step S208 is YES, the step S210 checks whether or not a vacant line via which the transmission can be made exists for any of the remaining transmitting destinations. If a vacant line does not exist, a vacant line is waited. On the other hand, if a vacant line exists and the decision result in the step S210 is YES, a transmission to the Xth transmitting destination is started in the step S211. But before the step S210 is carried out, the step S209 sets X to X=2.

After the transmission starts, the communication control unit 116 checks whether or not the transmission to all of the transmitting destinations started, in the step S212. If the decision result in the step S212 is NO, X is incremented to X=X+1 in the step S213, and the process returns to the step S210. On the other hand, if the decision result in the step S212 is YES, the process ends after waiting for the transmission to all of the transmitting destinations to end.

According to the process shown in FIG. 3, the broadcast transmission is started at the time when the transmission to the first transmitting destination ends. In this case, the reading of the document by the image reader 111 (and storage of the read image data into the image data storage 112) ends before the transmission of the image data to the first transmitting destination. For this reason, the start of the broadcast transmission to the second and subsequent transmitting destinations becomes after the transmission to the first transmitting destination ends, to thereby delay the process.

Figure 4:
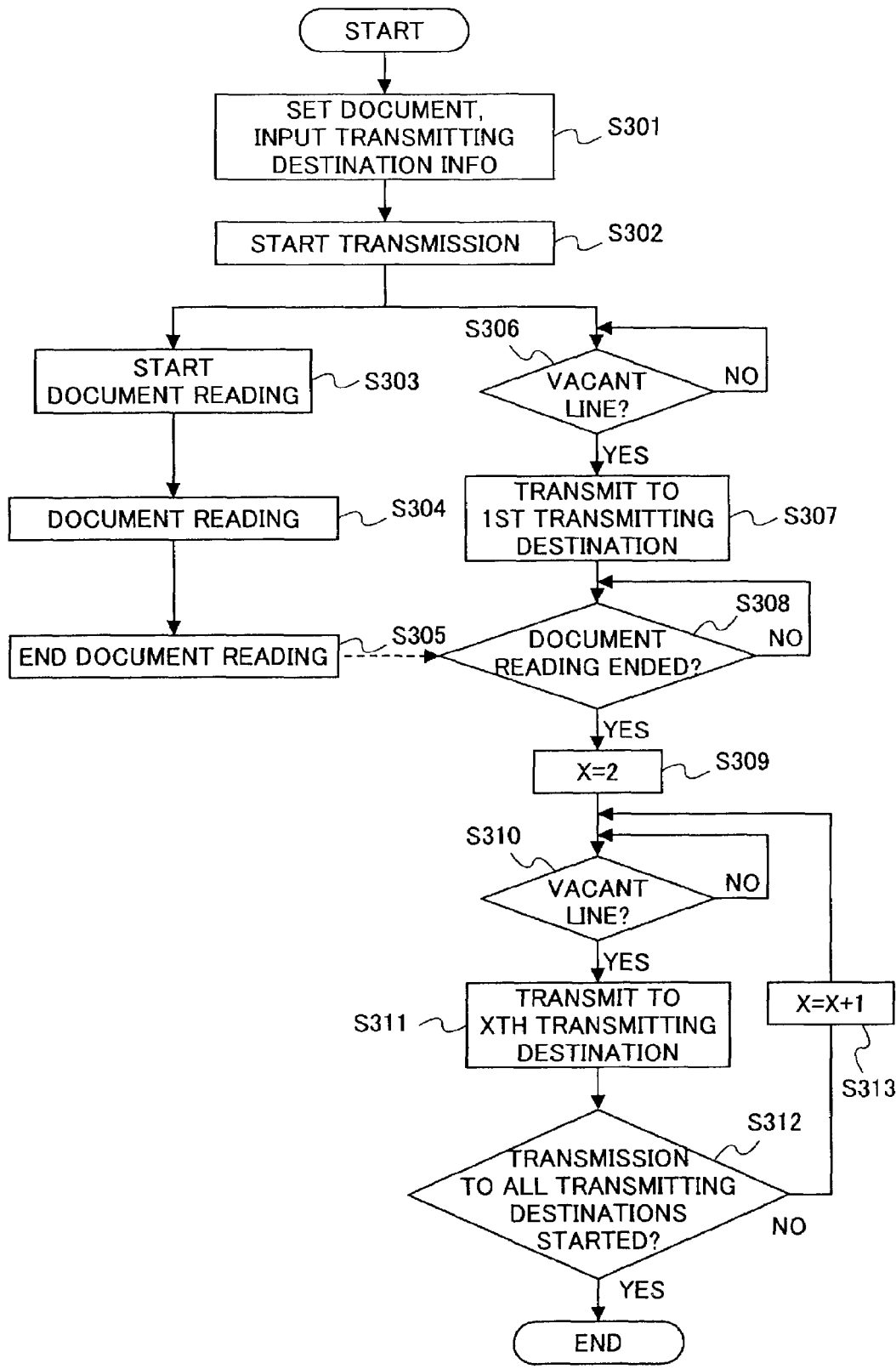
FIG. 4 is a flow chart for explaining a transmission at a timing after reading by an image reader ends.

These inconveniences can be eliminated by making the transmission at the above described timing (1-3). A description will be given of the operation, that is, steps S301 through S315 shown in FIG. 4, of the facsimile apparatus 1 when making the transmission at the above described timing (1-3). FIG. 4 is a flow chart for explaining the transmission at the timing (1-3) after the reading by the image reader 111 ends.

The process of the steps S301 through S305 from the setting of the document to the image reader 111, the inputting of the transmitting destination information N1 through Nk, and ending of the reading of the document, is the same as that of the steps S101 through S105 shown in FIG. 2 and the steps S201 through S205 shown in FIG. 3.

Simultaneously as the start of the process of the step S303, the communication control unit 116 checks whether or not a vacant line capable of transmitting to one of the transmitting destinations is available in the step S306. If a vacant line does not exist, a vacant line is waited. On the other hand, if a vacant line exists and the decision result in the step S306 is YES, the process advances to the step S307 which starts a transmission to the first transmitting destination.

After the transmission to the first transmitting destination starts, the communication control unit 116 checks whether or not the document reading by the image reader 111 ended, in the step S308. If the document reading ended in the step S305 and the decision result in the step S308 is YES, the step S310 checks whether or not a vacant line via which the transmission can be made exists for any of the remaining transmitting destinations. If a vacant line does not exist, a vacant line is waited. On the other hand, if a vacant line exists and the decision result in the step S310 is YES, a transmission to the Xth transmitting destination is started in the step S311. But before the step S310 is carried out, the step S309 sets X to X=2.

After the transmission starts, the communication control unit 116 checks whether or not the transmission to all of the transmitting destinations started, in the step S312. If the decision result in the step S312 is NO, X is incremented to X=X+1 in the step S313, and the process returns to the step S310. On the other hand, if the decision result in the step S312 is YES, the process ends after waiting for the transmission to all of the transmitting destinations to end.

Next, a description will be given of a transmission process in response to receiving transferred data, and not reading of the document. When a plurality of transfer destinations are registered in the transfer destination storage 114, the communication control unit 116 carries out one of the following transfer controls.

(2-1) Start transfer control of received image data to a first transfer destination when the data communication unit 115 starts to receive the image data; and (2-2) Start transfer control of received image data to a plurality of transfer destinations after the data communication unit 115 ends receiving the image data.

The transfer control (2-1) may be carried out at any of the following timings, so as to start the transfer control of the image data stored in the image data storage 112 to a second and subsequent transfer destinations.

(2-1-1) A timing which is the same as the transmission of the image data to the first transfer destination or before this transmission ends;

(2-1-2) A timing after the transmission of the image data to the first transfer destination ends; and (2-1-3) A timing after the data reception of the data communication unit 115 ends.

Figure 5:
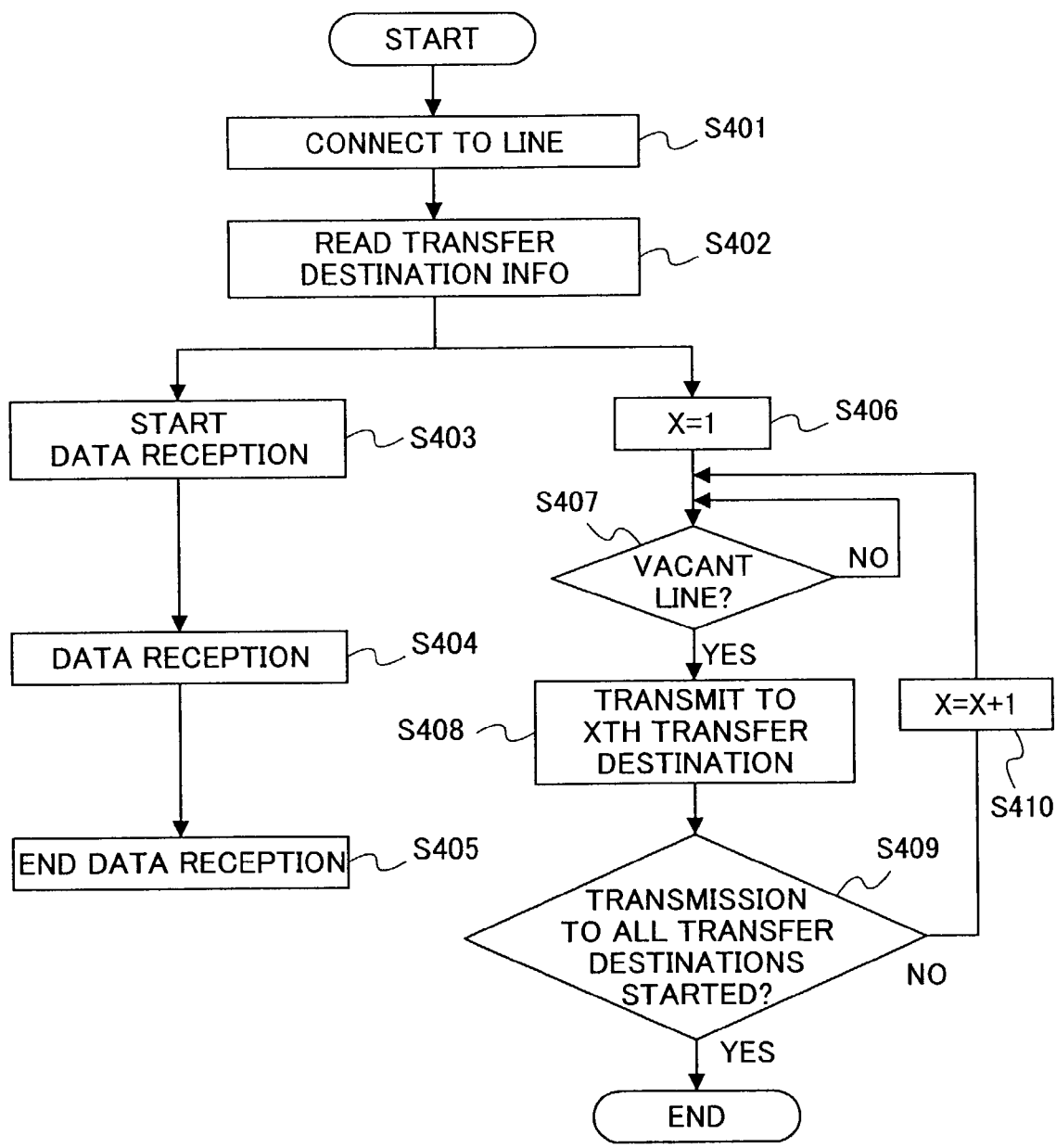
FIG. 5 is a flow chart for explaining a transmission at a timing which is the same as the transmission of the image data to a first transfer destination or before this transmission ends.

Next, a description will be given of the operation, that is, steps S401 through S410 shown in FIG. 5, of the facsimile apparatus 1 when making the transmission at the above described timing (2-1-1). FIG. 5 is a flow chart for explaining the transmission at the timing (2-1-1) which is the same as the transmission of the image data to the first transfer destination or before this transmission ends.

When a line is connected in the step S401, transfer destination information M1 through Mk related to a broadcast transmission which is to be made is called from a predetermined memory, such as a system memory which will be described later, in the step S402. The communication control unit 116 starts reception of the image data by the data communication unit 115 in the step S403. The image data are stored in the image data storage 112 in the order received. In FIG. 5, the step S404 carries out a process during the data reception, and the step S405 carries out a process of ending the data reception.

Simultaneously as the start of the process of the step S403, the communication control unit 116 checks whether or not a vacant line capable of transmitting to one of the transfer destinations is available in the step S407. If a vacant line does not exist, a vacant line is waited. On the other hand, if a vacant line exists and the decision result in the step S407 is YES, the process advances to the step S408 which starts a transmission to an Xth transfer destination. Before the step S407 is carried out, X is initialized to X=1 in the step S406.

After the transmission to the Xth transfer destination starts, the communication control unit 116 checks whether or not the transmission to all of the transfer destinations started, in the step S409. More particularly, X and k are compared to determine whether or not the transmission is started to all of the transfer destinations. If X<k and the decision result in the step S409 is NO, X is incremented to X=X+1 in the step S410, and the process returns to the step S407. On the other hand, if the decision result in the step S409 is YES, the process ends after waiting for the transmission to all of the transfer destinations to end.

During the data reception in the step S404 shown in FIG. 5, a reception error may occur, while the transmission is being made to the plurality of transfer destinations. The reception error may be a transmission interruption of the image data from a transmitting source, lack of storage capacity in the image data storage 112 or the like. In such cases, an error will be generated in all of the lines connected in this state. As a result, the communication expenses of the interrupted transmissions become high, and it also becomes necessary to take measures to request the transfer destinations to destroy the incompletely received transmissions of the document.

Figure 6:
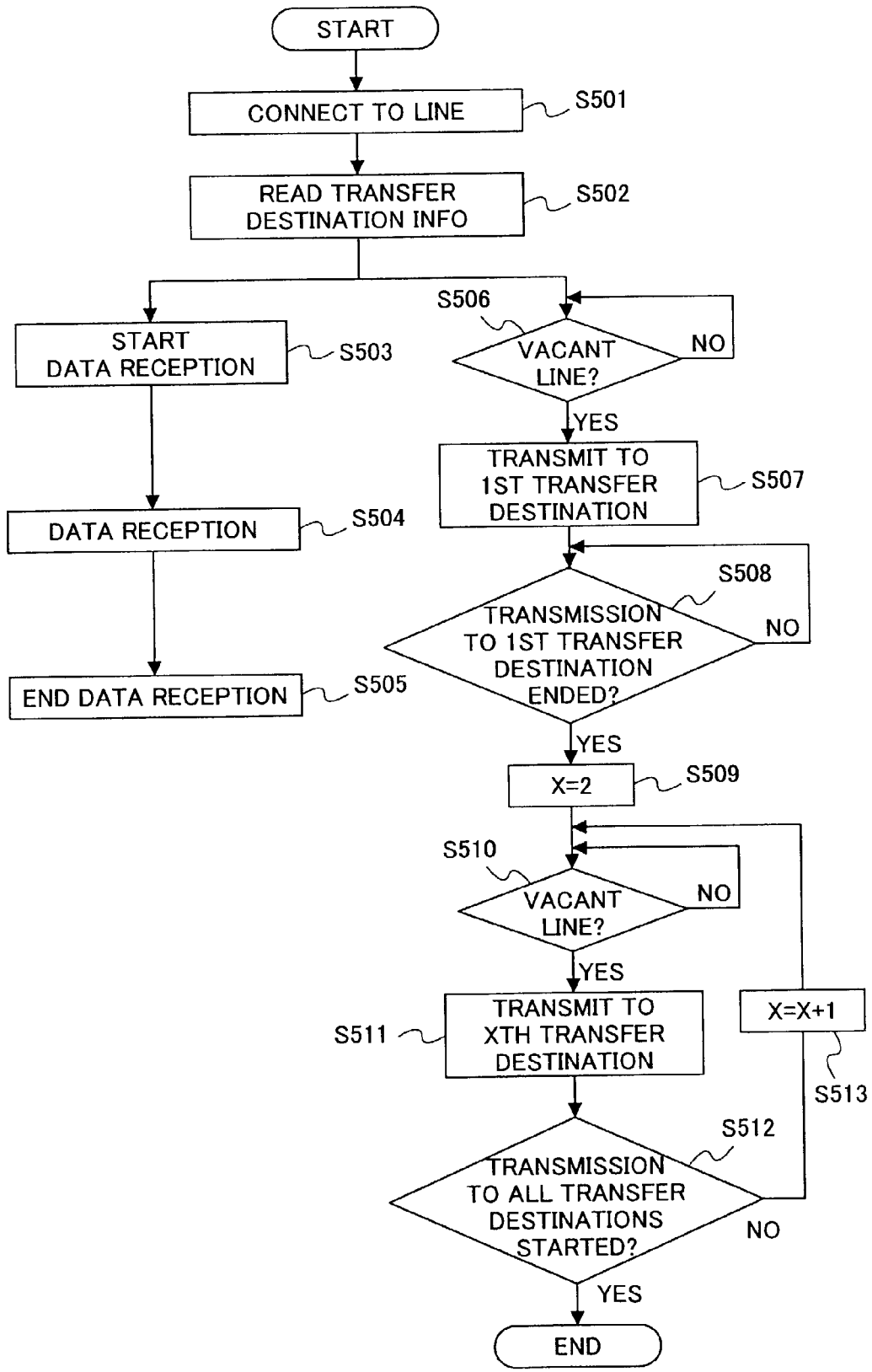
FIG. 6 is a flow chart for explaining a transmission at a timing after the transmission of the image data to the first transfer destination ends.

These inconveniences can be eliminated by making the transmission at the above described timing (2-1-2). A description will be given of the operation, that is, steps S501 through S513 shown in FIG. 6, of the facsimile apparatus 1 when making the transmission at the above described timing (2-1-2). FIG. 6 is a flow chart for explaining the transmission at the timing (2-1-2) after the transmission of the image data to the first transfer destination ends.

The process of the steps S501 through S505 from the connection of the line, the inputting of the transmitting destination information M1 through Mk, and ending of the transmission, is the same as that of the steps S401 through S405 shown in FIG. 5.

Simultaneously as the start of the data reception process of the step S503, the communication control unit 116 checks whether or not a vacant line capable of transmitting to one of the transfer destinations is available in the step S506. If a vacant line does not exist, a vacant line is waited. On the other hand, if a vacant line exists and the decision result in the step S506 is YES, the process advances to the step S507 which starts a transmission to the first transfer destination.

After the transmission to the first transfer destination starts, the communication control unit 116 checks whether or not the transmission by the data communication unit 115 ended, in the step S508. If the decision result in the step S508 is YES, the step S510 checks whether or not a vacant line via which the transmission can be made exists for any of the remaining transfer destinations. If a vacant line does not exist, a vacant line is waited. On the other hand, if a vacant line exists and the decision result in the step S510 is YES, a transmission to the Xth transfer destination is started in the step S511. But before the step S510 is carried out, the step S509 sets X to X=2.

After the transmission to the Xth transfer destination starts, the communication control unit 116 checks whether or not the transmission to all of the transfer destinations started, in the step S512. If the decision result in the step S512 is NO, X is incremented to X=X+1 in the step S513, and the process returns to the step S510. On the other hand, if the decision result in the step S512 is YES, the process ends after waiting for the transmission to all of the transfer destinations to end.

According to the process shown in FIG. 6, the broadcast transmission is started at the time when the transmission to the first transfer destination ends. In this case, the data reception by the data communication unit 115 ends before the transmission of the image data to the first transfer destination. For this reason, the start of the broadcast transmission to the second and subsequent transfer destinations becomes after the transmission to the first transfer destination ends, to thereby delay the process.

Figure 7:
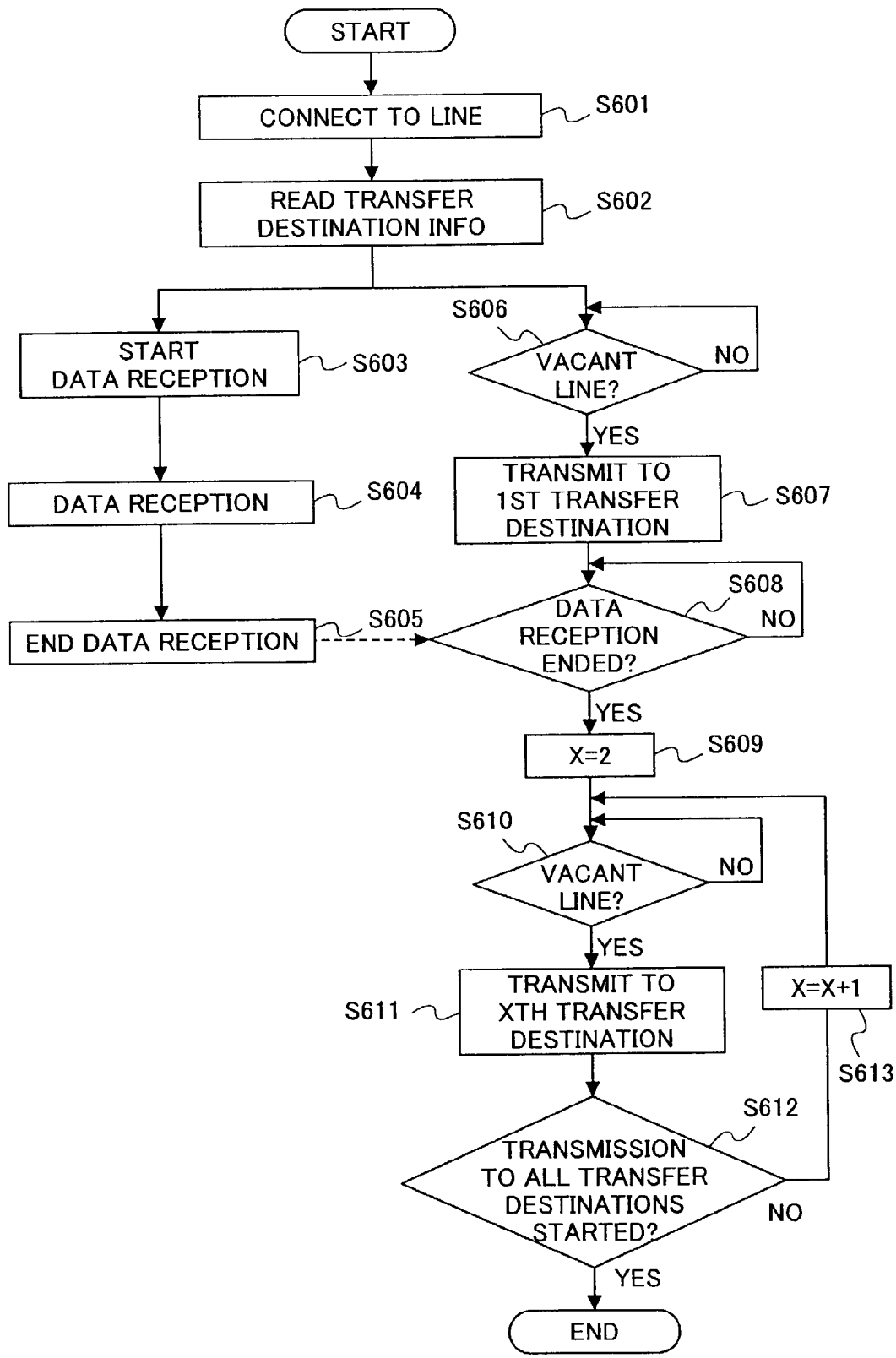
FIG. 7 is a flow chart for explaining a transmission at a timing after data reception of a data communication unit ends.

These inconveniences can be eliminated by making the transmission at the above described timing (2-1-3). A description will be given of the operation, that is, steps S601 through S613 shown in FIG. 7, of the facsimile apparatus 1 when making the transmission at the above described timing (2-1-3). FIG. 7 is a flow chart for explaining the transmission at the timing (2-1-3) after data reception of the data communication unit 115 ends.

The process of the steps S601 through S605 from the connection of the line, the storage of the transmitting destination information M1 through Mk into the system memory, and ending of the data reception by the data communication unit 115, is the same as that of the steps S401 through S405 shown in FIG. 5 and the steps S501 through S505 shown in FIG. 6.

Simultaneously as the start of the data reception process of the step S603, the communication control unit 116 checks whether or not a vacant line capable of transmitting to one of the transfer destinations is available in the step S606. If a vacant line does not exist, a vacant line is waited. On the other hand, if a vacant line exists and the decision result in the step S606 is YES, the process advances to the step S607 which starts a transmission to the first transfer destination.

After the transmission to the first transfer destination starts, the communication control unit 116 checks whether or not the data reception by the data communication unit 115 ended, in the step S608. If the document reading ended in the step S605 and the decision result in the step S608 is YES, the step S610 checks whether or not a vacant line via which the transmission can be made exists for any of the remaining transfer destinations. If a vacant line does not exist, a vacant line is waited. On the other hand, if a vacant line exists and the decision result in the step S610 is YES, a transmission to the Xth transfer destination is started in the step S611. But before the step S610 is carried out, the step S609 sets X to X=2.

After the transmission starts, the communication control unit 116 checks whether or not the transmission to all of the transfer destinations started, in the step S612. If the decision result in the step S612 is NO, X is incremented to X=X+1 in the step S613, and the process returns to the step S610. On the other hand, if the decision result in the step S612 is YES, the process ends after waiting for the transmission to all of the transfer destinations to end.

Figure 8:
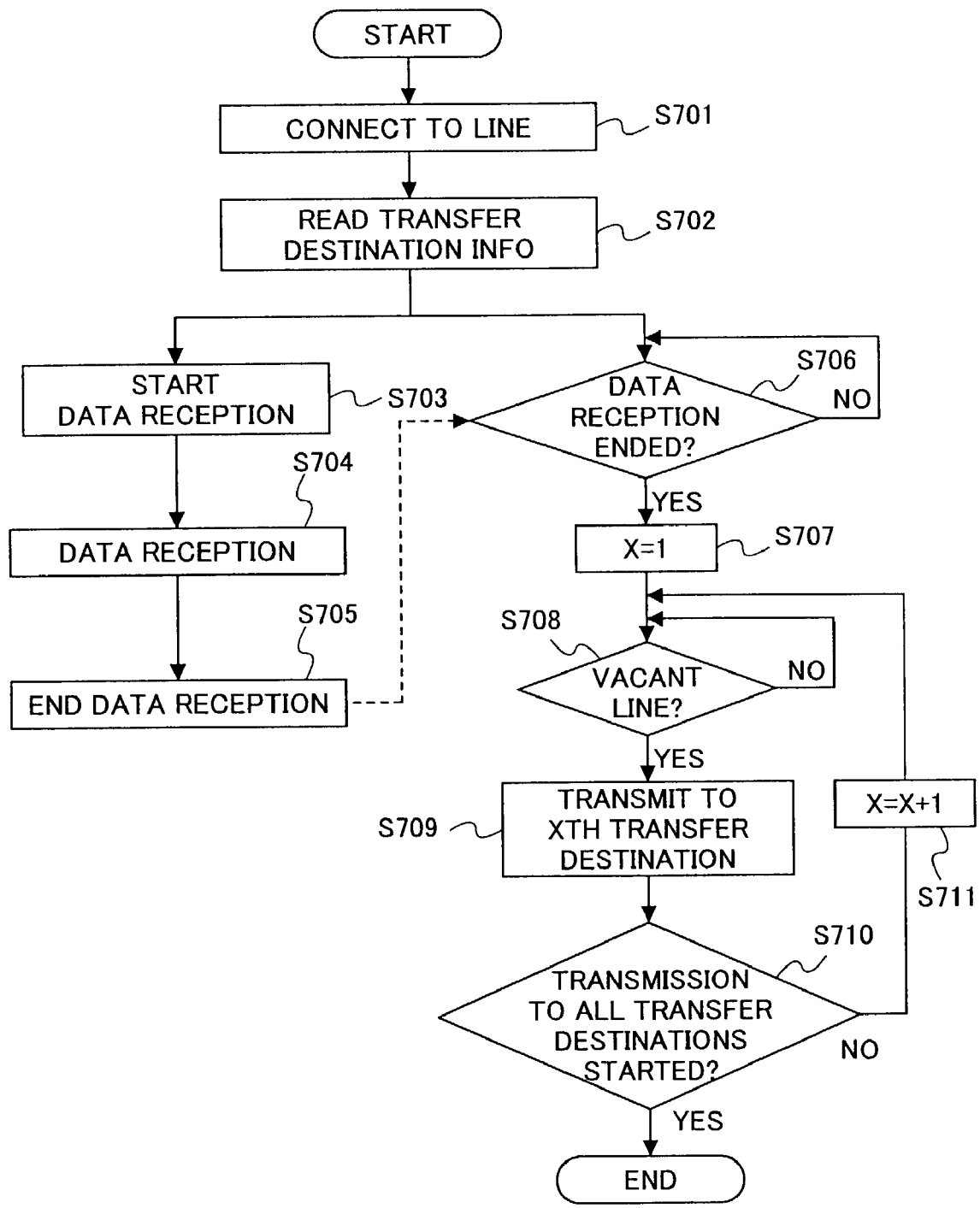
FIG. 8 is a flow chart for explaining a process of starting a transfer control of received data to a plurality of transfer destinations after the data reception of the data communication unit ends.

According to the processes shown in FIGS. 5 through 7, the data transfer is made while receiving the data. For this reason, if an error is generated during the data reception, the transmission to the transfer destination may be interrupted or, an erroneous page may be transmitted to the transfer destination. In order to eliminate such inconveniences, the communication control unit 116 may carry out the process (2-2) which starts the transfer control of received image data to the plurality of transfer destinations after the data communication unit 115 ends receiving the image data. A description will be given of the operation, that is, steps S701 through S713 shown in FIG. 8, of the facsimile apparatus 1 when carrying out the above described process (2-2). FIG. 8 is a flow chart for explaining the process of starting the transfer control of received data to the plurality of transfer destinations after the data reception of the data communication unit 115 ends.

The process of the steps S701 through S705 from the connection of the line, the storage of the transmitting destination information M1 through Mk into the system memory, and ending of the data reception by the data communication unit 115, is the same as that of the steps S401 through S405 shown in FIG. 5, the steps S501 through S505 shown in FIG. 6, and the steps S601 through S605 shown in FIG. 7.

Simultaneously as the start of the data reception process of the step S703, the communication control unit 116 checks whether or not the data reception is ended in the step S706. If the data reception is not ended, the end of the data reception is waited. On the other hand, if the data reception is ended and the decision result in the step S706 is YES, the process advances to the step S708 which checks whether or not a vacant line via which the transmission can be made exists for the first transfer destination. If a vacant line does not exist, a vacant line is waited. On the other hand, if a vacant line exists and the decision result in the step S708 is YES, a transmission to the Xth transfer destination is started in the step S709. But before the step S708 is carried out, the step S707 sets X to X=1.

After the transmission starts, the communication control unit 116 checks whether or not the transmission to all of the transfer destinations started, in the step S710. If the decision result in the step S710 is NO, X is incremented to X=X+1 in the step S711, and the process returns to the step S708. On the other hand, if the decision result in the step S710 is YES, the process ends after waiting for the transmission to all of the transfer destinations to end.

Figure 9:
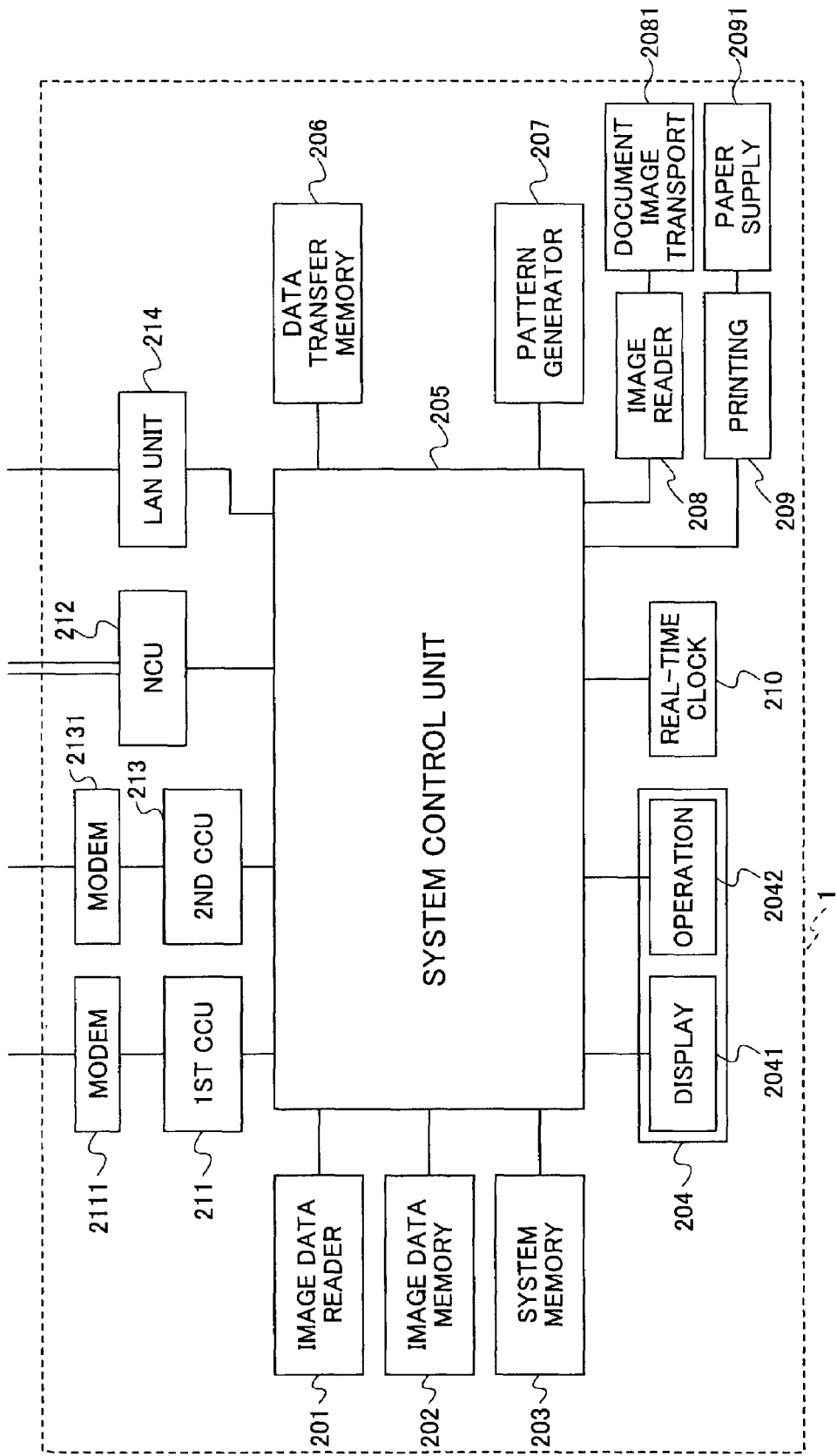
FIG. 9 is a system block diagram showing the structure of the first embodiment of the data communication apparatus in more detail.

Next, a more detailed description will be given of this first embodiment, by referring to FIG. 9. FIG. 9 is a system block diagram showing the structure of this first embodiment of the data communication apparatus in more detail. The facsimile apparatus 1 shown in FIG. 9 is substantially the same as the facsimile apparatus 1 shown in FIG. 1, except that FIG. 1 shows the functional structure while FIG. 9 shows the hardware structure.

The facsimile apparatus 1 shown in FIG. 9 includes an image data compressing and reproducing section (DCR) 201, an image data memory 202, a system memory 203, a user interface 204, a system control section 205, a data transfer memory (line buffer) 206, a pattern generator 207, an image reader 208, a printing section 209, a real-time clock 210, a first communication control unit (CCU) 211, a network control unit (NCU) 212, a second communication control unit (CCU) 213, and a LAN unit 214. The user interface 204 includes an operation section 2041 and a display section 2042. The image reader 208 includes a document image transport unit 2081. The printing section 209 includes a paper supply unit 2091. The first CCU 211 includes a modem 2111, and the second CCU 213 includes a modem 2131.

The image reader 208 corresponds to the image reader 111 shown in FIG. 1, and the image data memory 202 corresponds to the image data storage 112 shown in FIG. 1. The system memory 203 corresponds to the transmitting destination storage 113 and the transfer destination storage 114 shown in FIG. 1. A communication unit group which is made up of the first CCU 211, the NCU 212, the second CCU 211 and the LAN unit 214, corresponds to the data communication unit 115 shown in FIG. 1. Further, the system control section 205 corresponds to the communication control unit 116 shown in FIG. 1.

A description will now be given of the operation of the facsimile apparatus 1 shown in FIG. 9. In order to facilitate the understanding of this embodiment, it is assumed for the sake of convenience that the 2 lines of the NCU 212 shown in FIG. 9 cannot used.

The operation is as follows when making the transmission at the timing (1-1) which is the same as the transmission of the image data to the first transmitting destination or before this transmission ends.

Figure 10:
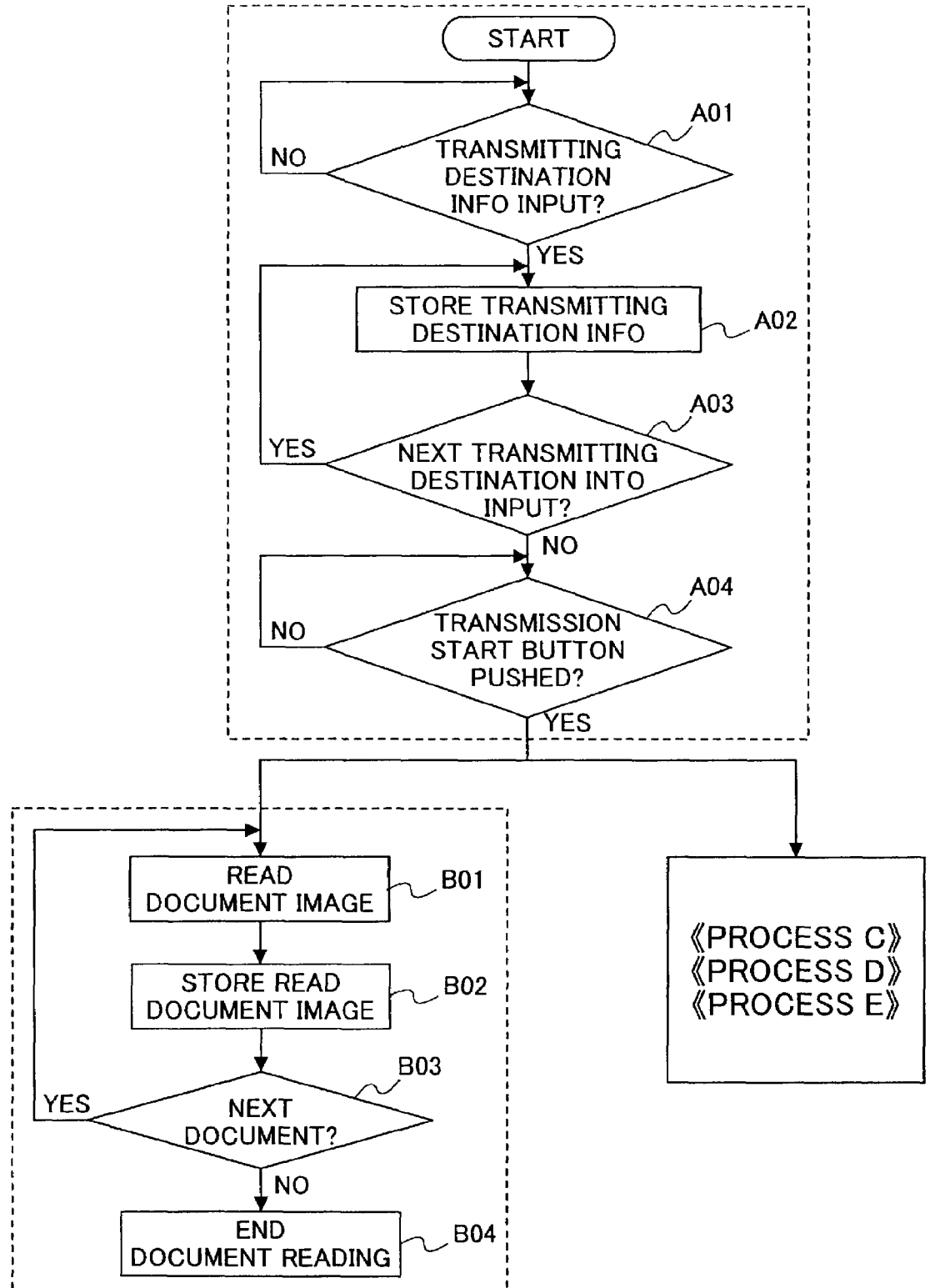
FIG. 10 is a flow chart for explaining a process A carried out prior to an image reading process B together with the image reading process B.

First, prior to the start of the transmission, a process A shown in FIG. 10, including steps A01 through A04, is carried out. FIG. 10 is a flow chart for explaining the process A carried out prior to an image reading process B together with the image reading process B. When the document is set in the document image transport unit 2081, the step A01 decides whether or not the plurality of transmitting destination information N1 through Nk are input from the operation section 2041. If the decision result in the step A01 is YES, the step A02 stores the input transmitting destination information into the system memory 203, and the step A03 decides whether or not the next transmitting destination information is input. The process returns to the step A02 if the decision result in the step A03 is NO, so that the transmitting destination information N1 through Nk are successively stored in the system memory 203. If the decision result in the step A03 is NO, the step A04 decides whether or not the transmission start button of the operation section 2041 is pushed. If the decision result in the step A04 is YES, the process B and a process C are carried out in parallel.

The process B includes steps B01 through B04 as shown in FIG. 10. First, the step B01 reads the document which is set in the document image transport unit 2081. Prior to reading the document, the system control section 205 checks whether or not the image reader 208 is usable, and the document set in the document image transport unit 2081 is read by the image reader 208 if the image reader 208 is usable. The read image data from the image reader 208 is stored in the data transfer memory 206 in units of 1 line, and transferred to the image data compressing and reproducing section (DCR) 201. In the step B02, the image data compressing and reproducing section 201 carries out an image compression based on the plurality of 1-line data and stores the compressed image data in the image data memory 202. The step B03 decides whether or not a next document exists, and the process returns to the step B01 if the decision result in the step B03 is YES. The step B04 ends the document reading process if the decision result in the step B03 is NO. Hence, the image data is stored in the image data memory 202 for all of the documents which are set in the document image transport unit 2081.

Figure 11:
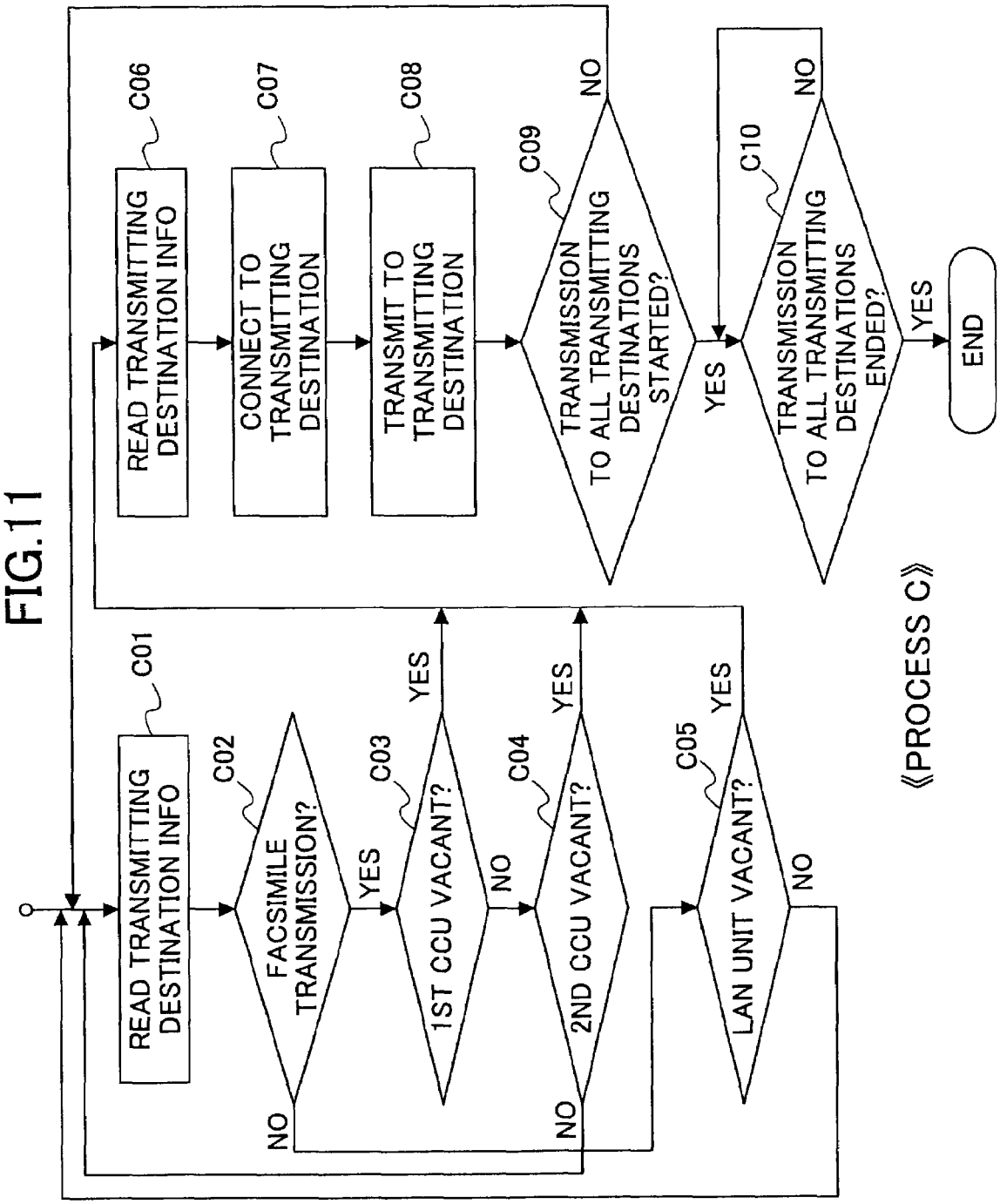
FIG. 11 is a flow chart for explaining a process C corresponding to a portion of the process carried out at the timing shown in FIG. 2.

FIG. 11 is a flow chart for explaining the process C corresponding to a portion of the process carried out at the timing shown in FIG. 2. The process C includes steps C01 through C10 as shown in FIG. 11. First, in order to check whether the transmitting destination is a telephone number or a network address, the step C01 reads the transmitting destination information (telephone number or network address) from the system memory 203.

For example, the system control section 205 checks whether or not the transmitting destination information is a telephone number, in the step C02. If the decision result in the step C02 is YES and a facsimile transmission is to be made, the step C03 checks whether or not the line of the first CCU 211 is vacant. If the decision result in the step C03 is YES, the step C04 checks whether or not the line of the second CCU 213 is vacant. If the transmission to be made is not a facsimile transmission and the decision result in the step C02 is NO, the step C05 checks whether or not the line of the LAN unit 214 is vacant.

The system control section 205 returns the process to the step C01 if the decision result in the step C04 or C05 is NO, so as to read the same or different transmitting destination information and carry out the process of the step C02 and the subsequent steps.

On the other hand, if the decision result in the step C03, C04 or C05 is YES, the system control section 205 reads the transmitting destination information (telephone number of mail address) from the system memory 203 in the step C06, and the step C07 makes a connection to the transmitting destination. The step C08 reads the image data from the image data memory 202 and starts a transmission to the transmitting destination. The step C09 checks whether or not the transmission to all of the transmitting destinations started. The process returns to the step C01 if the decision result in the step C09 is NO. If the decision result in the step C09 is YES, the step C10 checks whether or not the transmission to all of the transmitting destination ended. The process ends if the decision result in the step C10 is YES. Since the broadcast transmission is simultaneously made with respect to a plurality of lines and the broadcast transmission does not necessarily end simultaneously depending on the transmitting destination and/or the line, the step C10 waits for all of the transmissions to end.

The operation is as follows when making the transmission at the timing (1-2) which is after the transmission of the image data to the first transmitting destination.

First, prior to the start of the transmission, the process A described above is carried out. If the transmission start button of the operation section 2041 is pushed and the decision result in the step A04 shown in FIG. 10 is YES, the process B and a process D are carried out in parallel.

Figure 12:
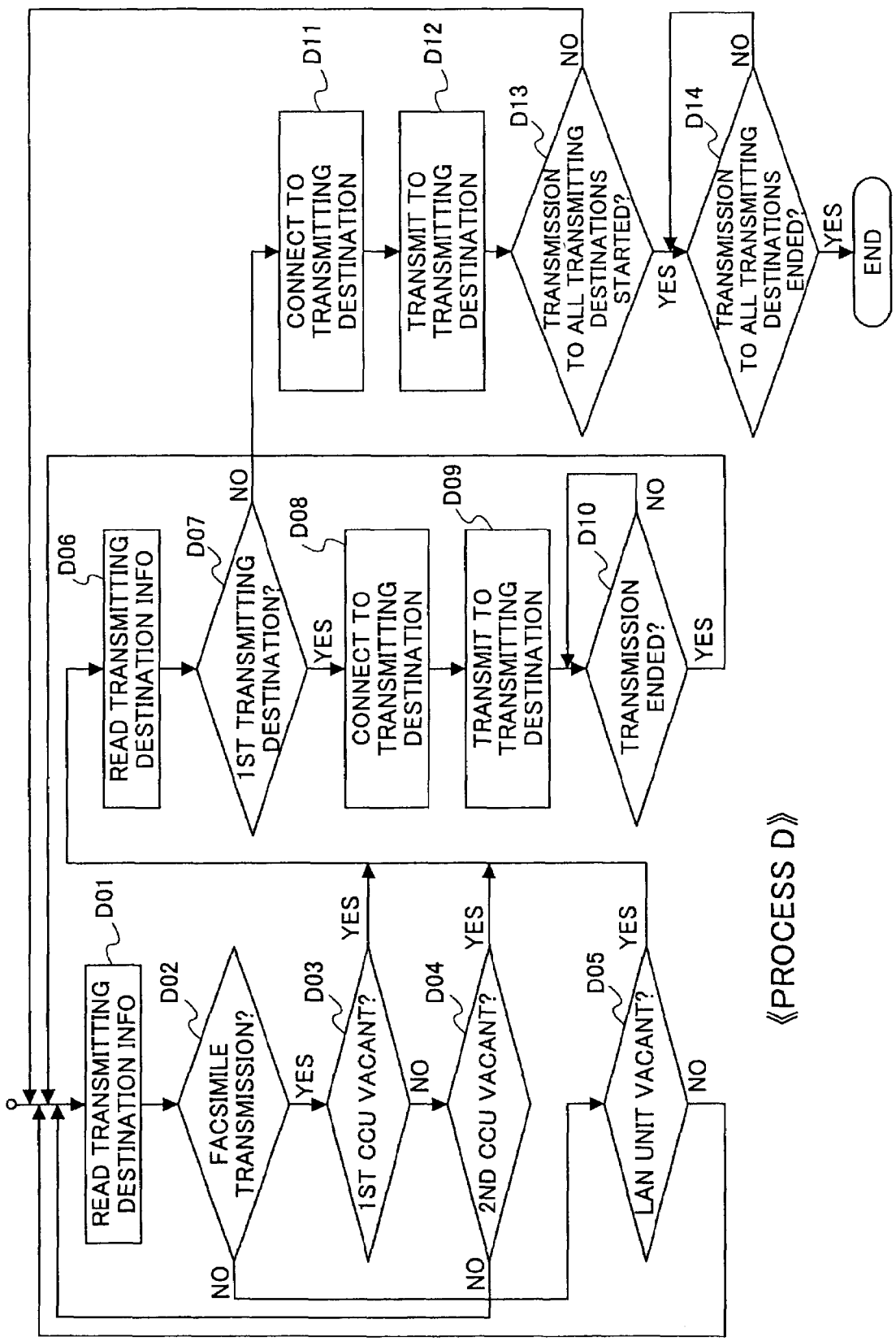
FIG. 12 is a flow chart for explaining a process D corresponding to a portion of the process carried out at the timing shown in FIG. 3.

FIG. 12 is a flow chart for explaining the process D corresponding to a portion of the process carried out at the timing shown in FIG. 3. The process D includes steps D01 through D14 as shown in FIG. 12. The process of the steps D01 through D05 is the same as that of the steps C01 through C05 shown in FIG. 11.

If the system control section 205 judges that a vacant line exists in one of the steps D03 through D05, the system control section 205 reads the transmitting destination information from the system memory 203 in the step D06. The step D07 checks whether or not the read transmitting destination is the first transmitting destination, and the step D08 makes a connection to the first transmitting destination if the decision result in the step D07 is YES. In addition, the step D09 reads the image data from the image data memory 202 and transmits the image data to the first transmitting destination. The step D10 decides whether or not the transmission ended. Hence, the end of the transmission is waited, and the process returns to the step D01 if the decision result in the step D10 is YES.

On the other hand, if the read transmitting destination is not the first transmitting destination and the decision result in the step D07 is NO, the step D11 makes a connection to a corresponding transmitting destination. In addition the step D12 reads the image data from the image data memory 202 and starts transmitting the image data to the corresponding transmitting destination. The step D13 checks whether or not the transmission is started with respect to all of the transmitting destinations, and the process returns to the step D01 if the decision result in the step D13 is NO. If the decision result in the step D13 is YES, the step C14 checks whether or not the transmission to all of the transmitting destination ended. The process ends if the decision result in the step D14 is YES.

The operation is as follows when making the transmission at the timing (1-3) which is after the reading by the image reader 208 ends.

First, prior to the start of the transmission, the process A described above is carried out. If the transmission start button of the operation section 2041 is pushed and the decision result in the step A04 shown in FIG. 10 is YES, the process B and a process E are carried out in parallel.

Figure 13:
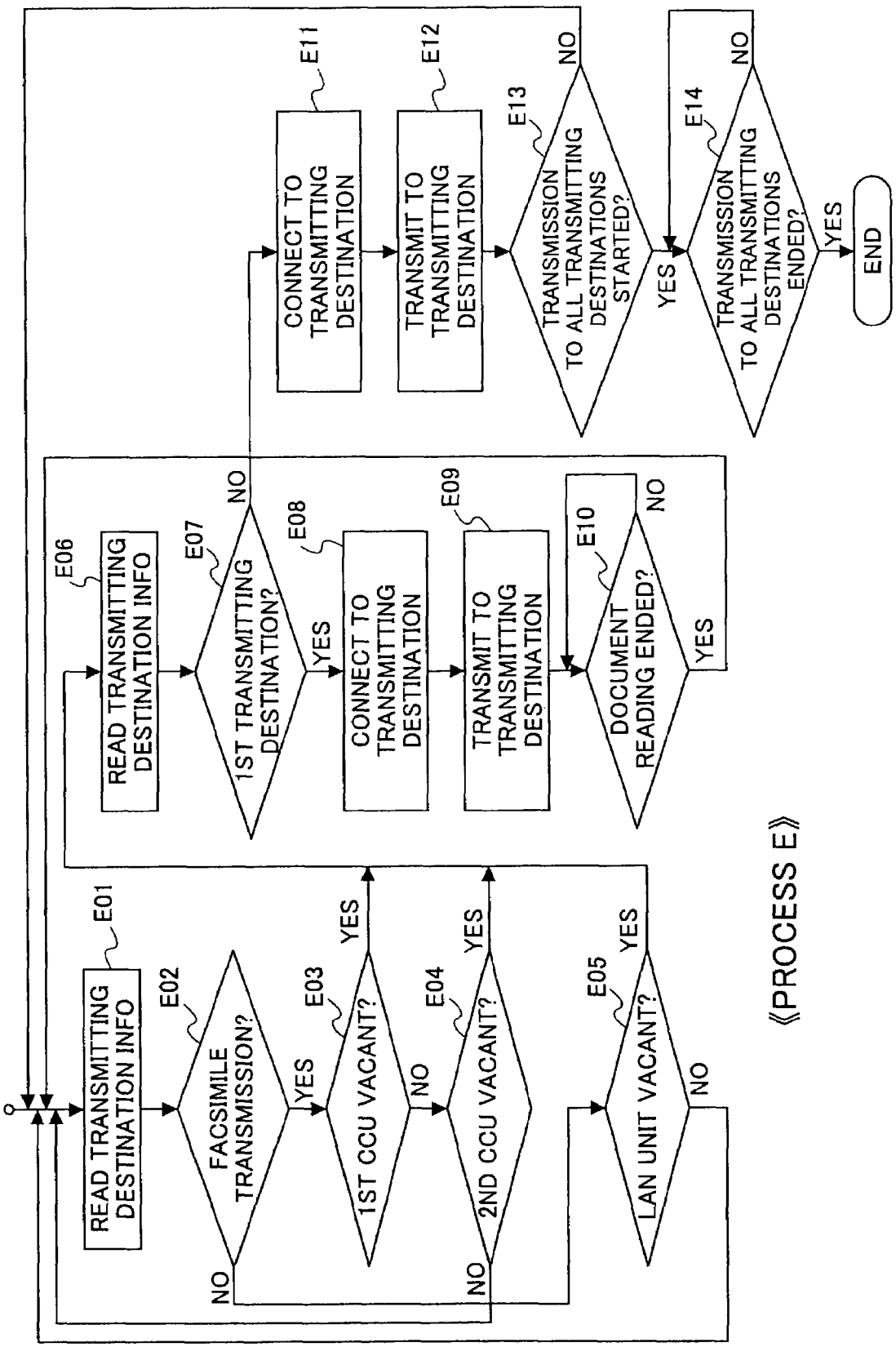
FIG. 13 is a flow chart for explaining a process E corresponding to a portion of the process carried out at the timing shown in FIG. 4.

FIG. 13 is a flow chart for explaining the process E corresponding to a portion of the process carried out at the timing shown in FIG. 4. The process E shown in FIG. 13 includes steps E01 through E14 which are the same as the steps D01 through D14 shown in FIG. 12, except for the judgement made in the step E10.

In other words, in the step D10 shown in FIG. 12, the end of the transmission of the image data to the first transmitting destination is waited before starting the transmission to the second and subsequent transmitting destinations in the steps D11 and D12. But in the step E10 shown in FIG. 13, the end of the document reading process of the image reader 208 is waited before starting the transmission to the second and subsequent transmitting destinations in the steps E11 and E12.

A description will now be given of another operation of the facsimile apparatus 1 shown in FIG. 9. In order to facilitate the understanding of this embodiment, it is assumed for the sake of convenience that 1 line of the NCU 212 shown in FIG. 9 is used for reception and the other 1 line cannot be used.

In the case (2-1) where the transfer control of the received image data to the first transfer destination starts when the first CCU 211, the second CCU 213 or the LAN unit 212 starts to receive the image data, the operation is as follows when making the transmission at the timing (2-1-1) which is the same as the transmission of the image data to the first transfer destination or before this transmission ends.

First, prior to the start of the transfer, a process F shown in FIG. 14, including steps F01 through F05, is carried out. FIG. 14 is a flow chart for explaining the process F carried out prior to transmission to the transfer destination together with an image reading process G.

The system control section 205 monitors reception of the transfer data, and decides whether or not the transfer data is received in the step F01. The step F02 starts the data reception if the decision result in the step F01 is YES. In addition, the step F03 checks whether or not the transfer destination information M1 through Mk is included in the received data. If the decision result in the step F03 is YES, the step F04 registers the transfer destination information M1 through Mk in a predetermined storage region of the system memory 203 and the process ends. On the other hand, if the decision result in the step F03 is NO, the step F05 carries out a normal data reception, and the process ends.

Figure 15:
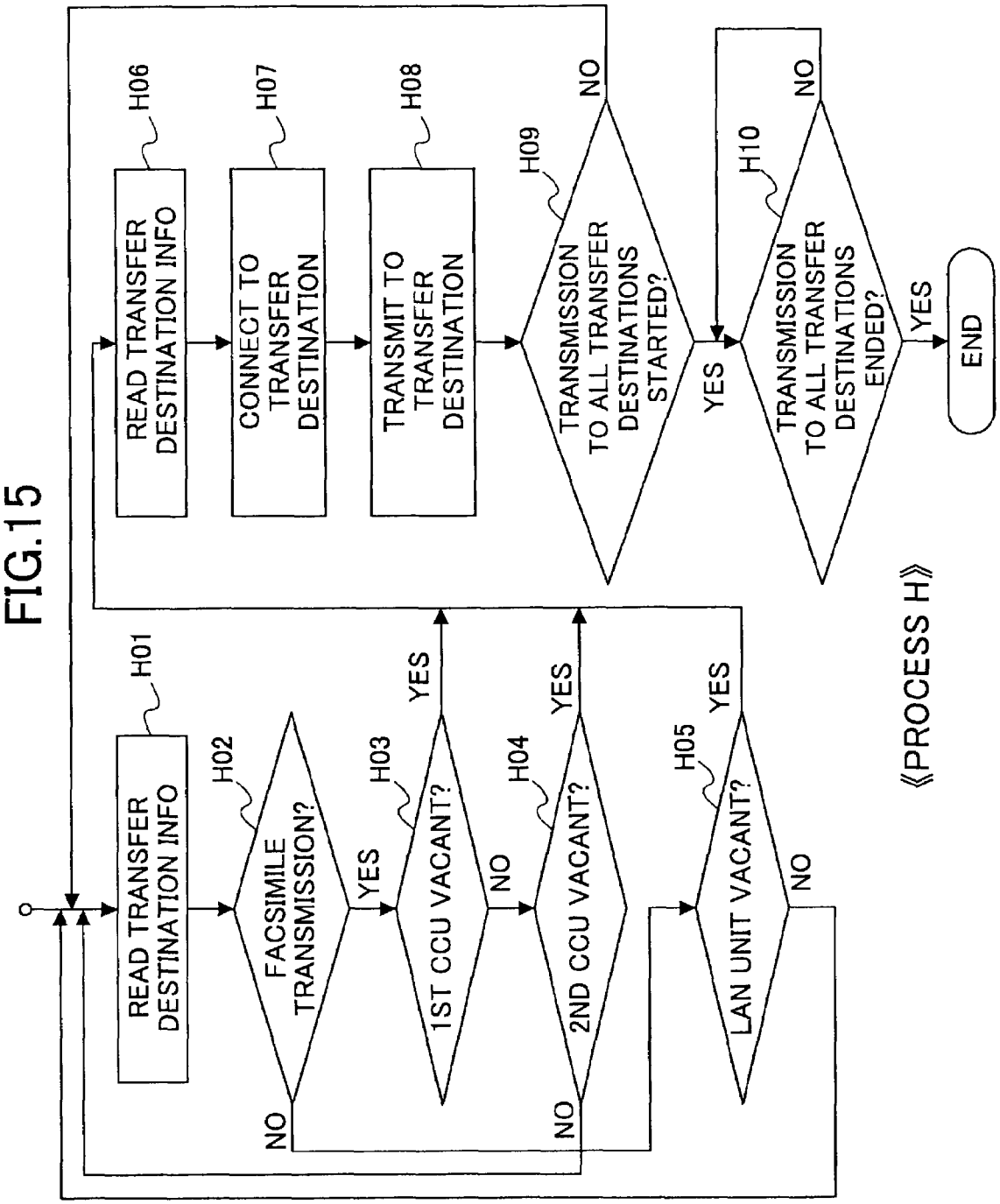
FIG. 15 is a flow chart for explaining a process H corresponding to a portion of the process carried out at the timing shown in FIG. 5.

After the transfer destination information M1 through Mk is registered in the system memory 203 by the step F04, the image reading process G and a process H shown in FIG. 15 are carried out in parallel.

The image reading process G includes steps G01 and G02. The step G01 stores the image data in the image data memory 202, and the step G02 ends the process when all transfer data are received.

FIG. 15 is a flow chart for explaining the process H corresponding to a portion of the process carried out at the timing shown in FIG. 5. The process H includes steps H01 through H10. The steps H01 through H10 respectively correspond to the steps C01 through C10 shown in FIG. 11, except that the "transmitting destination information" and the "transmitting destination" in the process C shown in FIG. 11 respectively are the "transfer destination information" and the "transfer destination" in the process H shown in FIG. 15. Accordingly, the description of the process H shown in FIG. 15 will be omitted.

The operation is as follows when making the transmission at the timing (2-1-2) which is after the transmission of the image data to the first transfer destination ends.

First, prior to the start of the transfer, a process F shown in FIG. 14 is carried out. After the transfer destination information M1 through Mk is registered in the system memory 203 by the step F04 shown in FIG. 14, the image reading process G and a process I shown in FIG. 16 are carried out in parallel.

Figure 16:
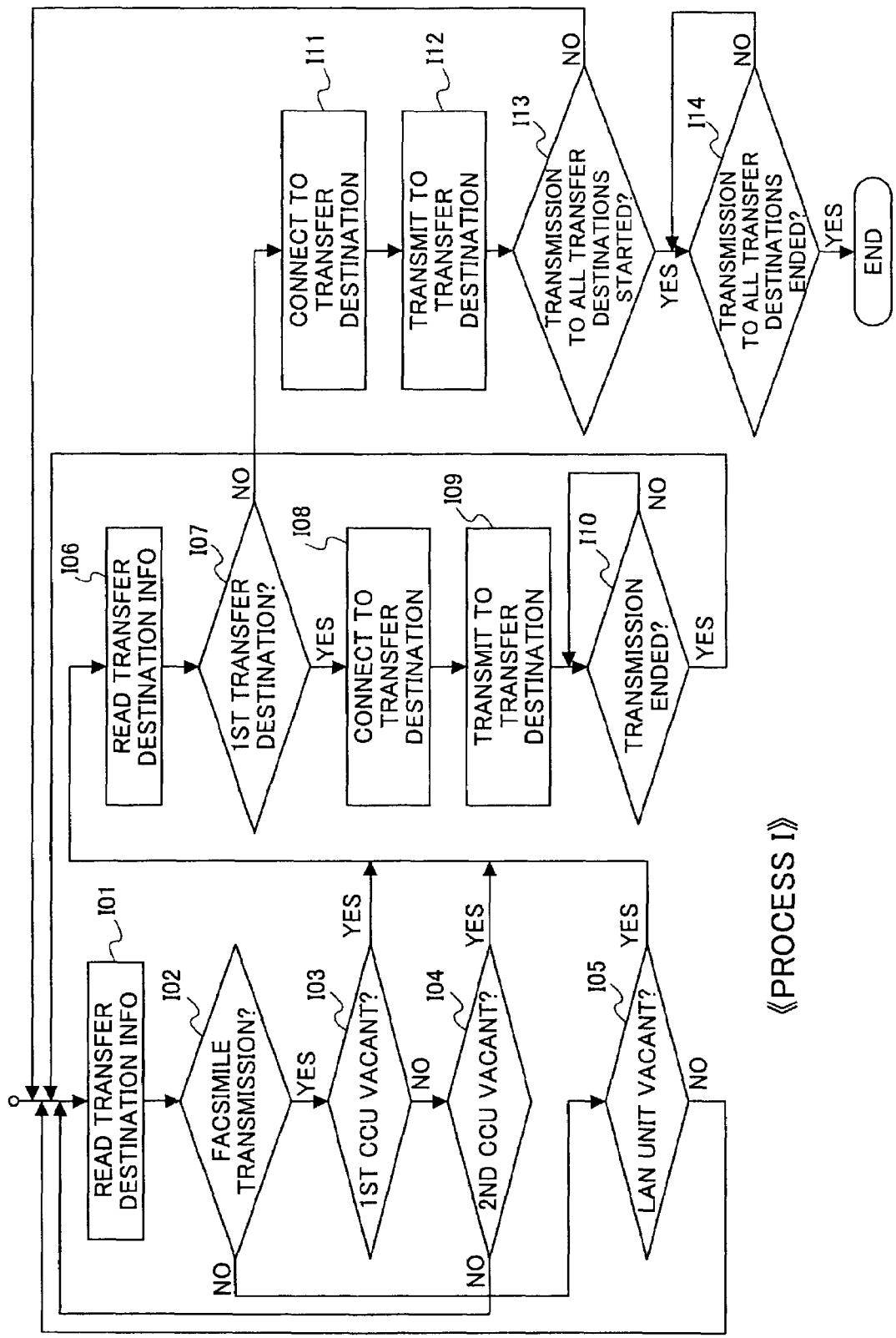
FIG. 16 is a flow chart for explaining a process I corresponding to a portion of the process carried out at the timing shown in FIG. 6.

FIG. 16 is a flow chart for explaining the process I corresponding to a portion of the process carried out at the timing shown in FIG. 6. The process I includes steps I01 through I14. The steps I01 through I14 respectively correspond to the steps D01 through D14 shown in FIG. 12, except that the "transmitting destination information" and the "transmitting destination" in the process D shown in FIG. 12 respectively are the "transfer destination information" and the "transfer destination" in the process I shown in FIG. 16. Accordingly, the description of the process I shown in FIG. 16 will be omitted.

The operation is as follows when making the transmission at the timing (2-1-3) which is after data reception of the first CCU 211, the second CCU 213 or the LAN unit 212 ends.

First, prior to the start of the transfer, a process F shown in FIG. 14 is carried out. After the transfer destination information M1 through Mk is registered in the system memory 203 by the step F04 shown in FIG. 14, the image reading process G and a process J shown in FIG. 17 are carried out in parallel.

Figure 17:
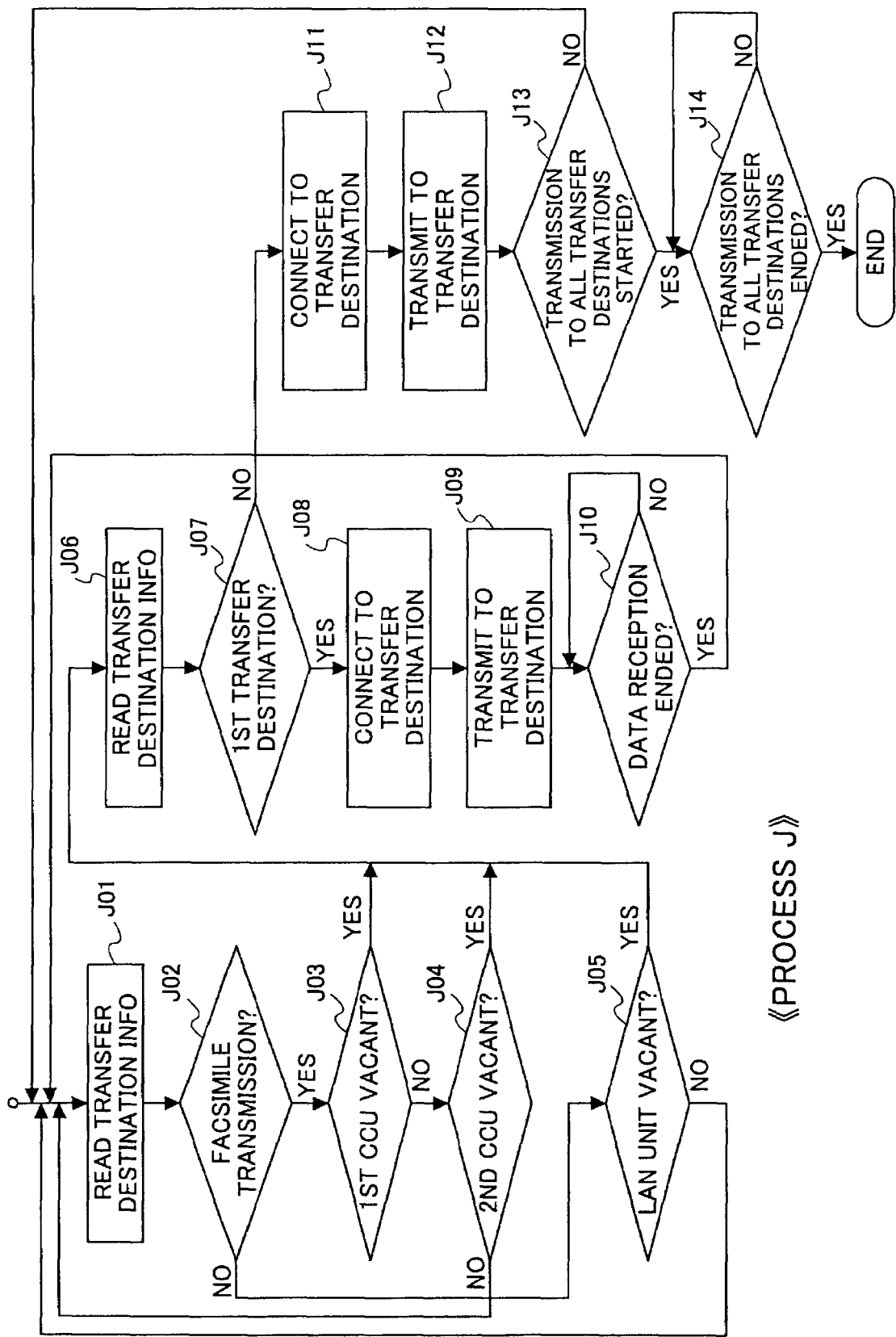
FIG. 17 is a flow chart for explaining a process J corresponding to a portion of the process carried out at the timing shown in FIG. 7.

FIG. 17 is a flow chart for explaining the process J corresponding to a portion of the process carried out at the timing shown in FIG. 7. The process J includes steps J01 through J14. The steps J01 through J14 respectively correspond to the steps E01 through E14 shown in FIG. 13, except that the "transmitting destination information" and the "transmitting destination" in the process E shown in FIG. 13 respectively are the "transfer destination information" and the "transfer destination" in the process J shown in FIG. 17, and that "end of document reading" determined in the step E11 shown in FIG. 13 is replaced by determination of "end of data reception" in the step J11. Accordingly, the description of the process J shown in FIG. 17 will be omitted.

In the case (2-2) where the transfer control of the received image data to the plurality of transfer destinations starts after the first CCU 211, the second CCU 213 or the LAN unit 212 ends receiving the image data, the operation is as follows.

First, prior to the start of the transfer, the process F shown in FIG. 14 is carried out. After the transfer destination information M1 through Mk is registered in the system memory 203 by the step F04 shown in FIG. 14, the image reading process G and a process K shown in FIG. 18 are carried out in parallel.

Figure 18:
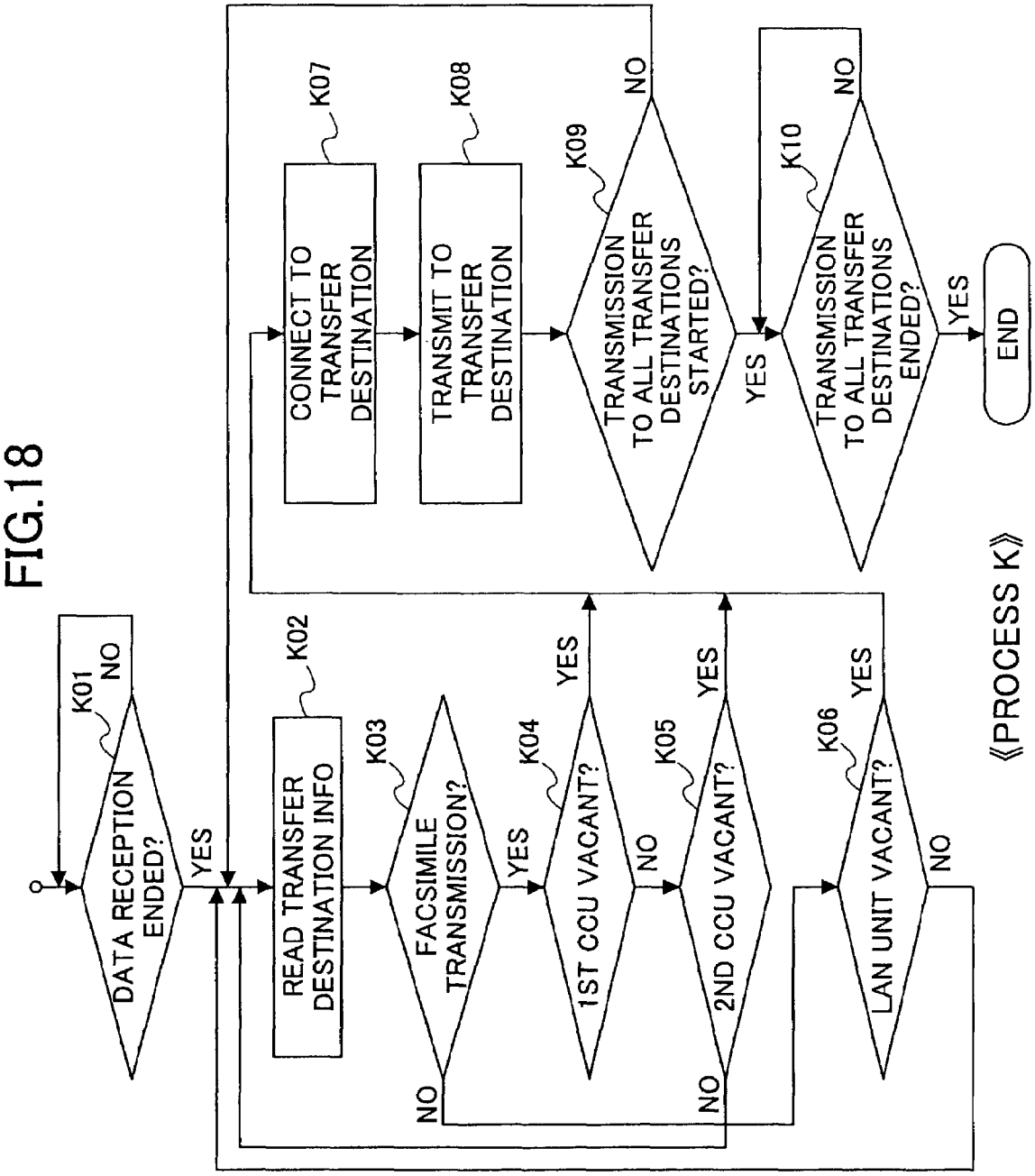
FIG. 18 is a flow chart for explaining a process K corresponding to a portion of the process shown in FIG. 8.

FIG. 18 is a flow chart for explaining the process K corresponding to a portion of the process shown in FIG. 8. The process K includes steps K01 through K10 shown in FIG. 18. The steps K02 through K10 respectively correspond to the steps H01 through H05 and H07 through H10 shown in FIG. 15. The step K01 checks whether or not the data reception is ended, and the process advances to the step K02 if the decision result in the step K01 is YES. Otherwise, the process K is basically the same as the process H shown in FIG. 15, and the description of the process K shown in FIG. 18 will be omitted.

Figure 19:
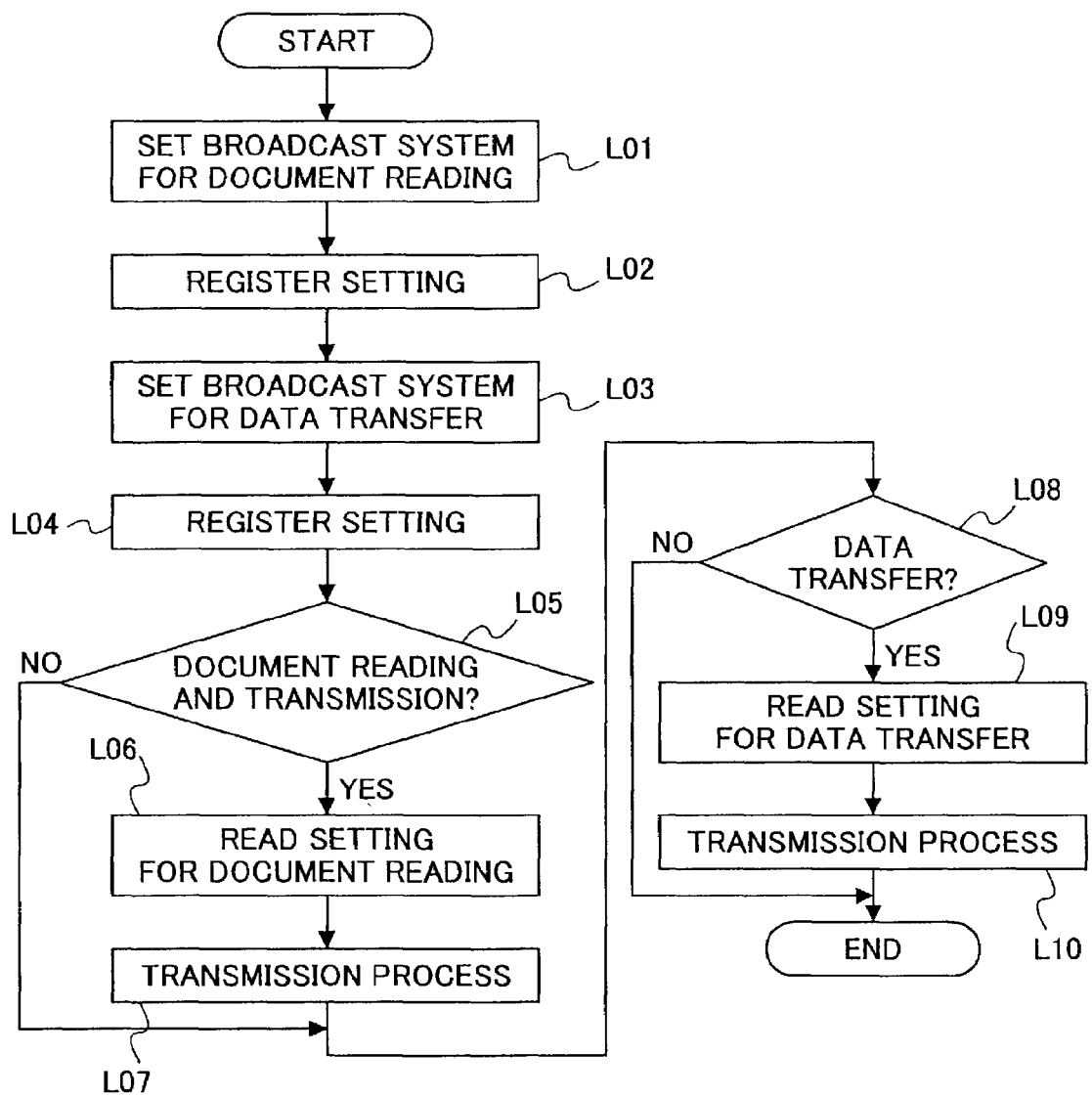
FIG. 19 is a flow chart for explaining the process of a modification of the first embodiment of the data communication apparatus.

Next, a description will be given of a modification of the first embodiment of the data communication apparatus according to the present invention. FIG. 19 is a flow chart for explaining a process L of this modification of the first embodiment of the data communication apparatus. The process L includes steps L01 through L10 shown in FIG. 19.

The step L01 sets a broadcast system employed when carrying out the document reading and transmission. This broadcast system refers to the transmission system employing one of the timings (1-1), (1-2) and (1-3) described above. The broadcast system set in the step L01 is registered in the system memory 203 in the step L02. In addition, the step L03 sets the broadcast system employed when carrying out the data transfer. This latter broadcast system refers to the transfer system employing one of the cases (2-1) and (2-2) or the timings (2-1-1), (2-1-2) and (2-1-3). The broadcast system set in the step L03 is registered in a predetermined region of the system memory 203 in the step L04.

When the two broadcast systems described above are set, the step L05 checks whether or not the document reading and transmission is to be made. If the decision result in the step L05 is YES, the step L06 calls the setting of the document reading and transmission stored in the system memory 203, and the step L07 carries out a predetermined transmission process depending on the setting. On the other hand, if the data transfer is to be made and the decision result in the step L05 is NO or, after the step L07, the step L08 checks whether or not the transmission is to be made by the data transfer. If the decision result in the step L08 is YES, the step L09 calls the setting of the data transfer stored in the system memory 203, and the step L10 carries out a predetermined transmission process depending on the setting. The process ends after the step L10 or, if the decision result in the step L08 is NO.

Figure 20:
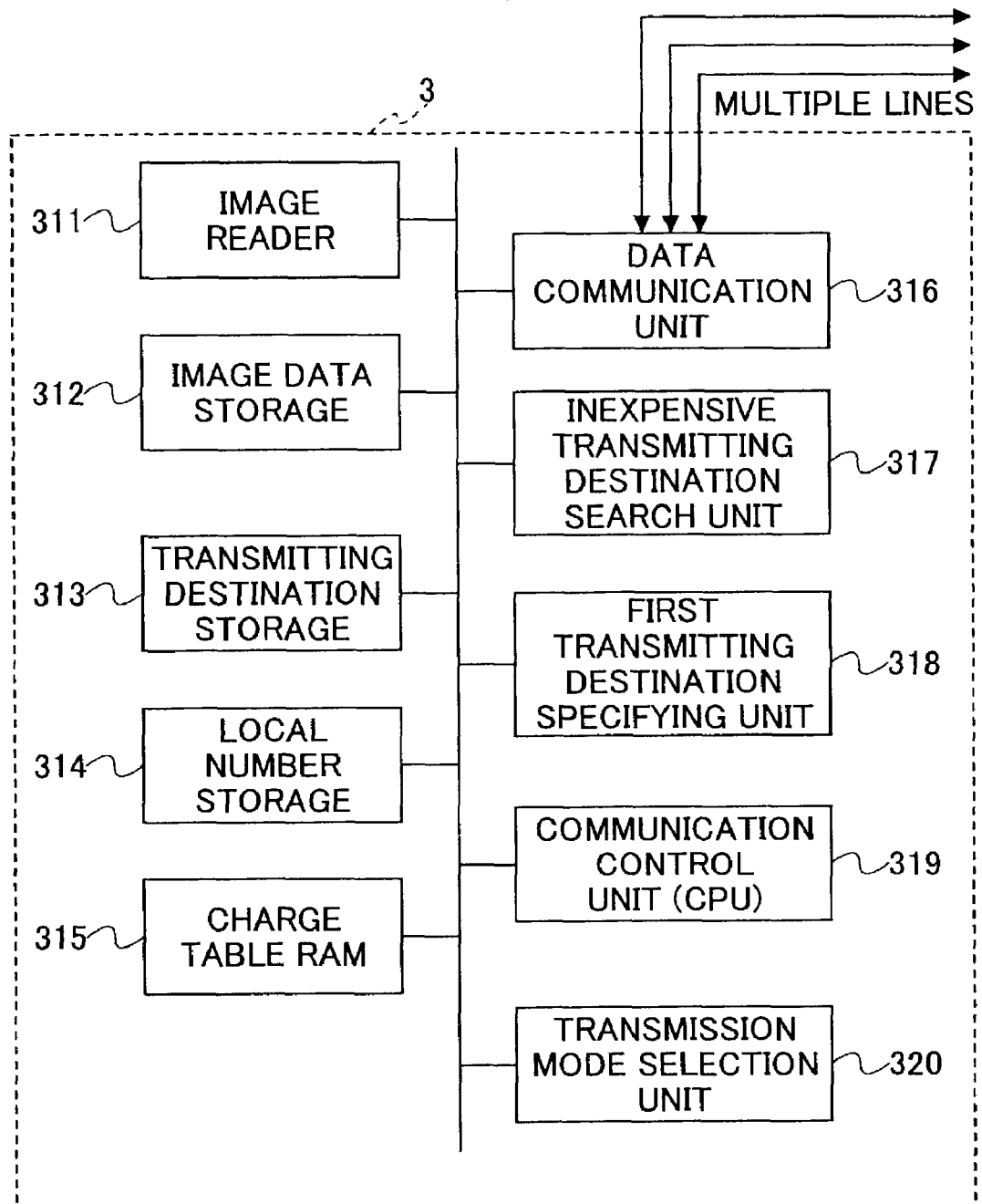
FIG. 20 is a functional block diagram showing a second embodiment of a data communication apparatus according to the present invention.

Next, a description will be given of a second embodiment of the data communication apparatus according to the present invention, by referring to FIG. 20. This second embodiment of the data communication apparatus employs a second embodiment of the data communication method according to the present invention. FIG. 20 is a functional block diagram showing the second embodiment of the data communication apparatus according to the present invention.

A facsimile apparatus 3 shown in FIG. 20 includes an image reader 311, an image data storage 312, a transmitting destination storage 313, a local number storage 314, a charge table RAM 315, a data communication unit 316, an inexpensive transmitting destination searching unit 317 which searches for a transmitting destination requiring low communication expenses, a first transmitting destination specifying unit 318, a communication control unit 319, and a transmission mode selection unit 320.

In this second embodiment, when a plurality of transmitting destinations are registered in the transmitting destination storage 313, the communication control unit 319 can start transmitting the image data stored in the image data storage 312 to the second and subsequent transmitting destinations, after the reading of the document by the image reader 311 ends.

The charge table RAM 315 stores the communication charge with respect to each transmitting destination in the form of a database. The inexpensive transmitting destination searching unit 317 can search for a minimum charge from the data stored in the charge table RAM 315. In addition, the user can select via the transmission mode selection unit 320 a transmission mode in which the transmission is to be made.

Figure 21:
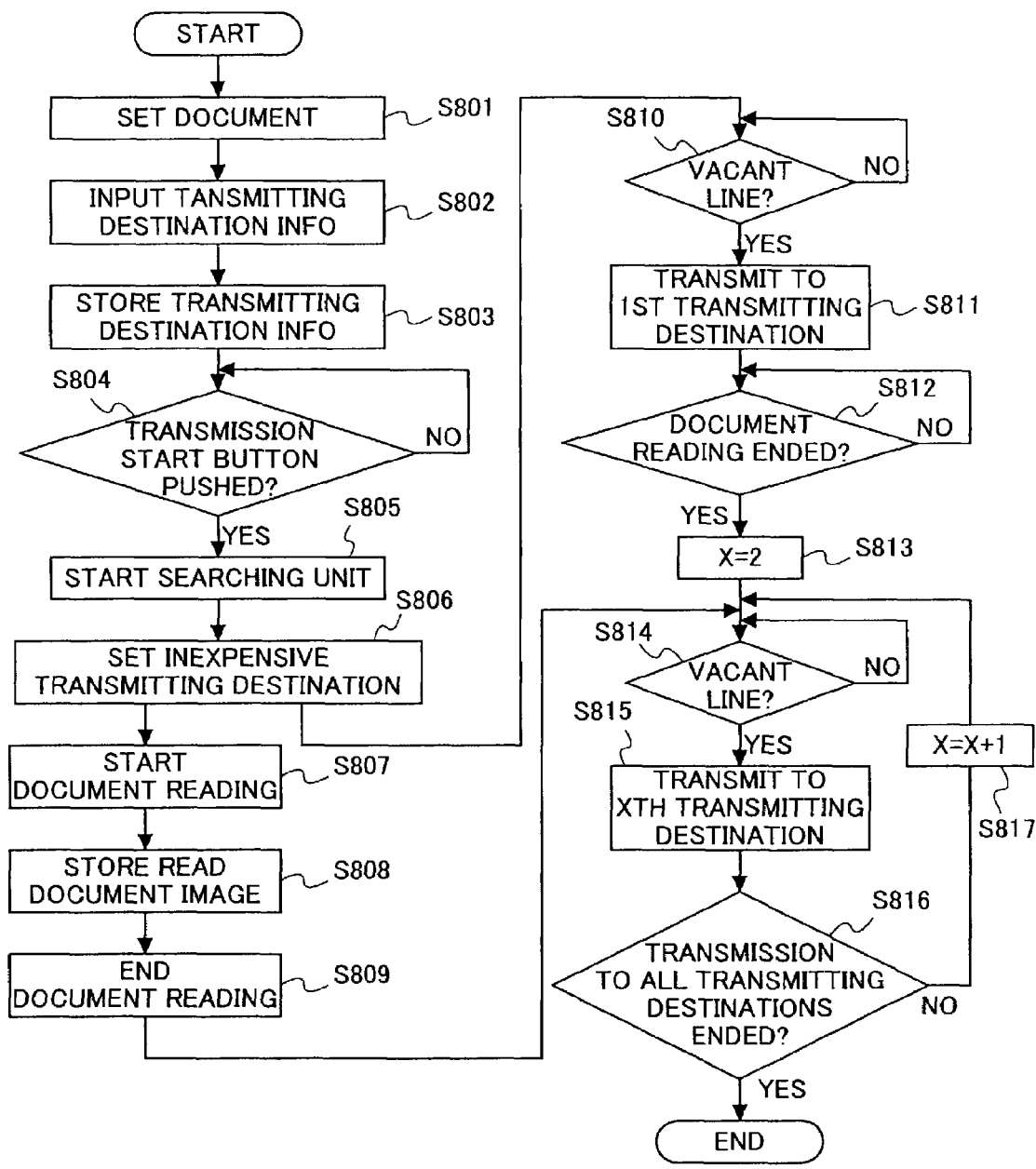
FIG. 21 is a flow chart for explaining an operation of the second embodiment of the data communication apparatus.

Next, a description will be given of the operation of the facsimile apparatus 3 shown in FIG. 20, by referring to FIG. 21. FIG. 21 is a flow chart for explaining the operation of the second embodiment of the data communication apparatus, that is, steps S801 through S817 carried out by the facsimile apparatus 3.

First, in the step S801, a document is set in the image reader 311. In the step S802, a plurality of transmitting destination information N1 through Nk, including telephone numbers, network addresses or the like of the transmitting destinations to which the broadcast transmission is to be made, are input using an operation section (not shown) such as an operation panel having a ten-key. The input transmitting destination information N1 through Nk is stored in the transmitting destination storage 313 in the step S803. If the transmitting destination information is registered in advance in groups, it is possible to call such registered groups.

The step S804 decides whether or not a transmission start button of the operation section is pushed and a transmission start instruction is issued. If the decision result in the step S804 is YES, the inexpensive transmitting destination searching unit 317 is started in the step S805. The inexpensive transmitting destination searching unit 317 successively reads the transmitting destination information from the transmitting destination storage 313, and determines the transmitting destination requiring the minimum charge per unit time by referring to the local number storage 314, in the step S806.

In this particular case, the first transmitting destination is determined as the transmitting destination requiring the minimum charge per unit time.

Thereafter, the reading of the document by the image reader 311 is started in the step S807, the read image data is stored in the image data storage 312 in the step S808, and the document reading process ends in the step S809 when all pages of the document are read.

The step S810 is carried out in parallel with the step S807 which starts reading of the document. The step S810 checks whether or not a vacant line capable of making a transmission to the first transmitting destination exists. A vacant line is waited if no vacant line exists. On the other hand, if the decision result in the step S810 is YES, the data communication unit 316 starts the transmission to the first transmitting destination in the step S811.

The communication control unit 319 checks whether or not the reading of the document by the image reader 311 ended, in the step S812. If the decision result in the step S812 is YES, the communication control unit 319 checks whether or not a vacant line exists in the step S814 depending on the type of line of the second transmitting destination, that is, whether the line is a telephone line or a LAN line. But before the process advances to the step S814, the step S813 sets X of the Xth transmitting destination to X=2. The step S814 waits for a vacant line if no vacant line exists. If the decision result in the step S814 is YES, The transmission to the Xth transmitting destination is started in the step S815.

After the transmission starts, the communication control unit 319 checks whether or not the transmission to all transmitting destinations started, in the step S816, by comparing X and the number k of transmitting destinations. If the decision result in the step S816 is NO, the step S817 increments X to X=X+1, and the process returns to the step S814. On the other hand, if the transmission to all transmitting destinations started and the decision result in the step S816 is YES, the process ends by waiting for the transmission to end.

In the process shown in FIG. 21, the step S810 checks whether or not a vacant line capable of making the transmission to the first transmitting destination exists, and a vacant line is waited if no vacant line exists. For this reason, in a case where the first transmitting destination is a dial-free line, a vacant line is waited if no vacant telephone line exists, even when a vacant LAN line does exist. But in this case where a vacant LAN line exists, if the transmitting destination includes a mail address, it is possible to transmit to the transmitting destination at this mail address via the vacant LAN line.

In other words, when the inexpensive transmitting destination searching unit 317 carries out the search in the step S806 and there exists a transmitting destination requiring the same or approximately the same communication charge for different types of lines such as the telephone line and the LAN line, and the dial-free telephone number and the mail address are included in the transmitting destination information, the mail address of the transmitting destination may be stored in a predetermined storage as a first candidate and the dial-free telephone number of the transmitting destination may be stored in the predetermined storage as a second candidate when making the search, and the second candidate may be newly designated as the first transmitting destination. More particularly, in a case where a destination having an area code close to the area code of the facsimile apparatus 3, this destination is selected as the transmitting destination. On the other hand, a priority order of selection may be lowered with respect to a transmitting destination which clearly requires a high communication charge, such as a transmitting destination located overseas.

In addition, when the transmitting destination information includes the dial-free telephone number and the mail address and the step S807 judges that no vacant line exists, it is possible to make a search again to newly set, as the first transmitting destination, the transmitting destination requiring the lowest communication charge of the transmitting destinations with different types of lines.

By carrying out the process of the steps S801 through S817 described above, even if the document reading process is interrupted by operating the stop key or a read error is generated during the document reading process when communicating with a plurality of transmitting destinations, the error is only generated in one line with the lowest charge. The read error may be caused by a paper jam or lack of storage capacity in the image data storage 312, as described above.

Figure 22:
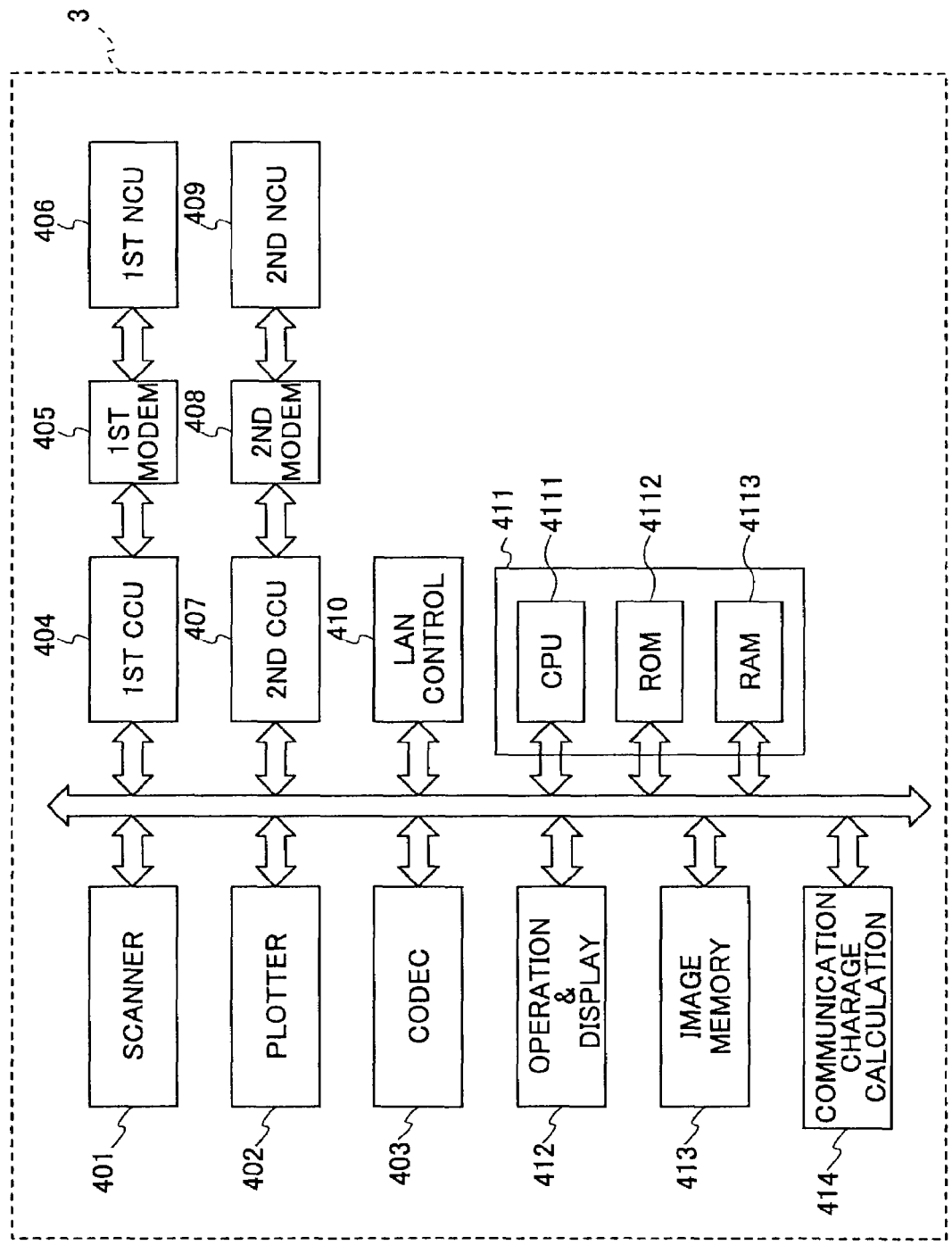
FIG. 22 is a system block diagram showing a structure of the second embodiment of the data communication apparatus in more detail.

Next, a more detailed description will be given of this second embodiment of the data communication apparatus, by referring to FIG. 22. FIG. 22 is a system block diagram showing a structure of the second embodiment of the data communication apparatus in more detail. The facsimile apparatus 3 shown in FIG. 22 is substantially the same as the facsimile apparatus 3 shown in FIG. 20, except that FIG. 20 shows the functional structure while FIG. 22 shows the hardware structure.

The facsimile apparatus 3 shown in FIG. 22 includes a scanner 401, a plotter 402, a codec (coder and decoder) 403, a first communication control unit (CCU) 404, a first modem 405, a first network control unit (NCU) 406, a second communication control unit (CCU) 407, a second modem 408, a second network control unit (NCU) 409, a LAN unit 401, a system control unit 411, a operation and display section 412, an image memory 413, and a communication charge calculation unit 414. The system control unit 411 includes a CPU 4111, a ROM 4112 and a RAM 4113.

The scanner 401 corresponds to the image reader 311 shown in FIG. 20, and the image memory 413 corresponds to the image data storage 312 shown in FIG. 20. Predetermined regions of the RAM 4113 respectively correspond to the transmitting destination storage 313 and the local number storage 314 shown in FIG. 20. In addition, a communication unit group, which is made up of the first CCU 404, the first modem 405, the first NCU 406, the second CCU 407, the second modem 408, the second NCU 409 and the LAN unit 410, corresponds to the data communication unit 316 shown in FIG. 20. Furthermore, the system control unit 411 corresponds to the inexpensive transmitting destination searching unit 317 and the first transmitting destination specifying unit 318 shown in FIG. 20, and the system control unit 411 also corresponds to the communication control unit 319 shown in FIG. 20. In FIG. 22, it is assumed for the sake of convenience that there is no charge per unit time with respect to the use of the LAN line.

Figure 23:
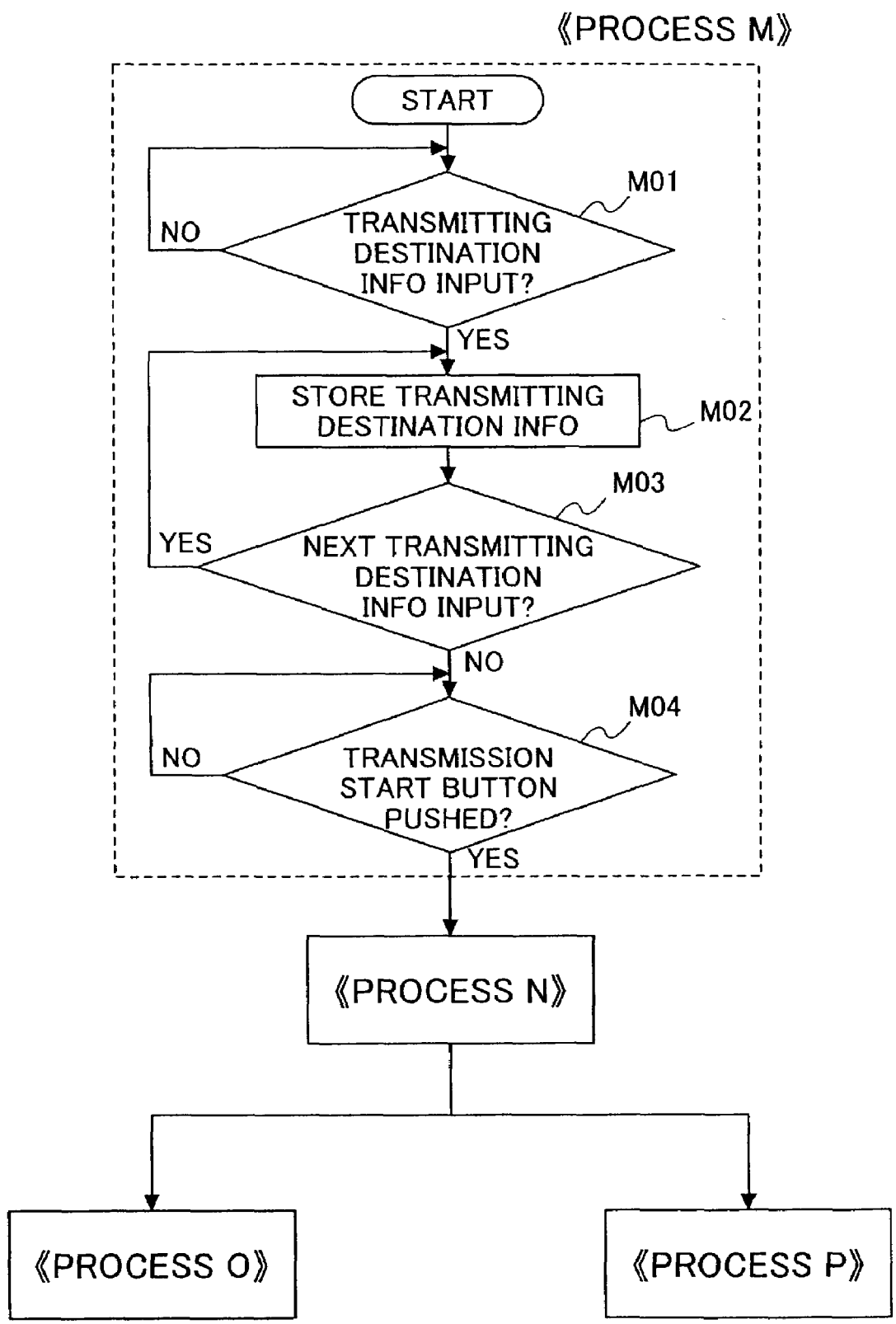
FIG. 23 is a flow chart for explaining a process M carried out prior to transmission.

First, prior to the start of the transmission, a process M shown in FIG. 23 is carried out. FIG. 23 is a flow chart for explaining the process M carried out prior to transmission. The process M includes steps M01 through M04 shown in FIG. 23.

The step M01 decides whether or not the transmitting destination information is input. When the document is set in the scanner 401 and the plurality of transmitting destination information N1 through Nk is input from the operation and display section 412, the decision result in the step M01 becomes YES, and the step M02 stores the input transmitting destination information in a predetermined storage region of the RAM 4113. The step M03 decides whether or not the next transmitting destination information is input, and the process returns to the step M02 if the decision result in the step M03 is YES. Hence, the transmitting destination information N1 through Nk is successively stored in the predetermined storage region of the RAM 4113. The step M04 decides whether or not the transmission start button of the operation and display section 412 is pushed. If the decision result in the step M04 is YES, the process advances to a document reading process N shown in FIG. 24.

Figure 24:
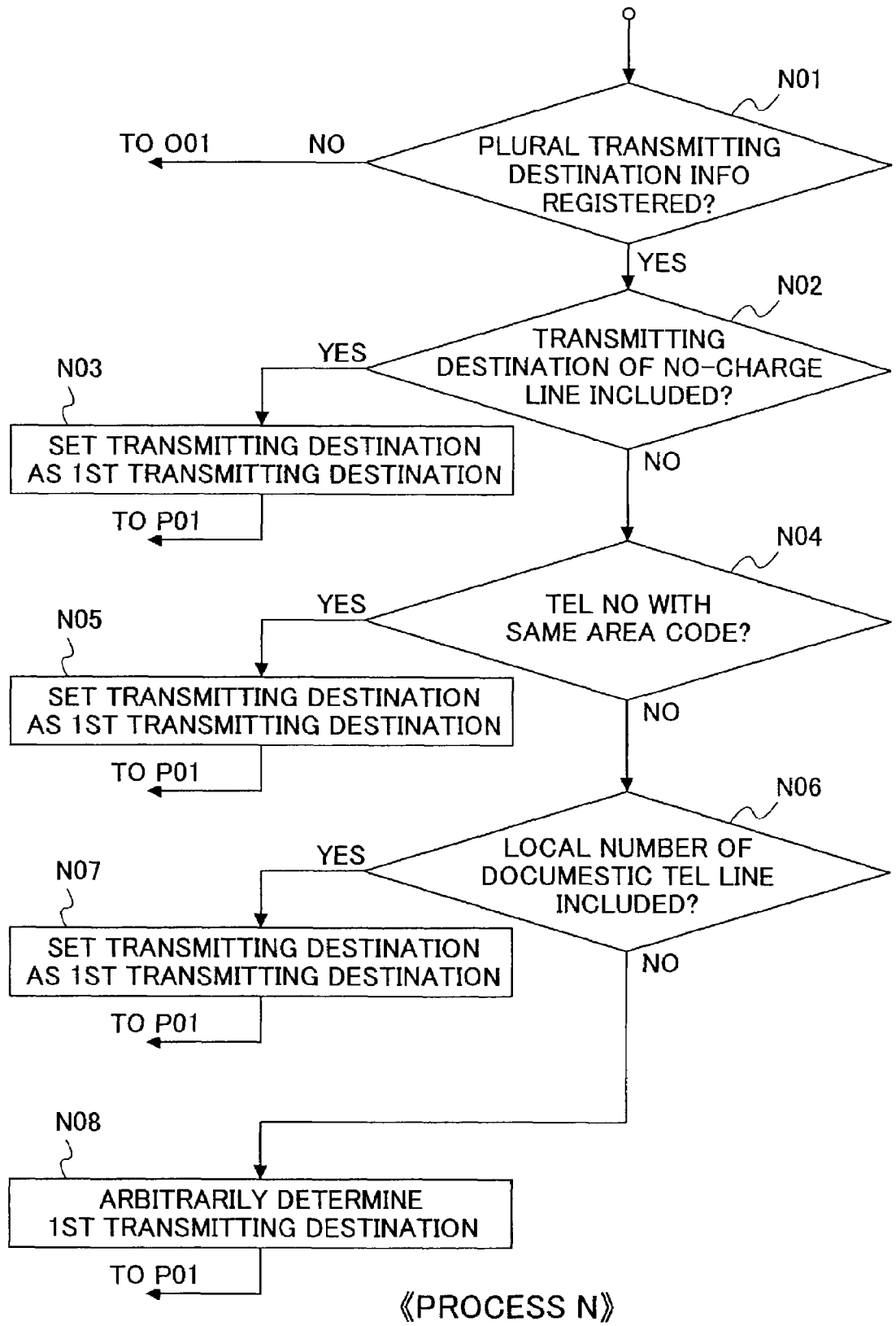
FIG. 24 is a flow chart for explaining a document reading process N.

FIG. 24 is a flow chart for explaining the document reading process N. The document reading process N includes steps N01 through N08 shown in FIG. 24.

Figure 25:
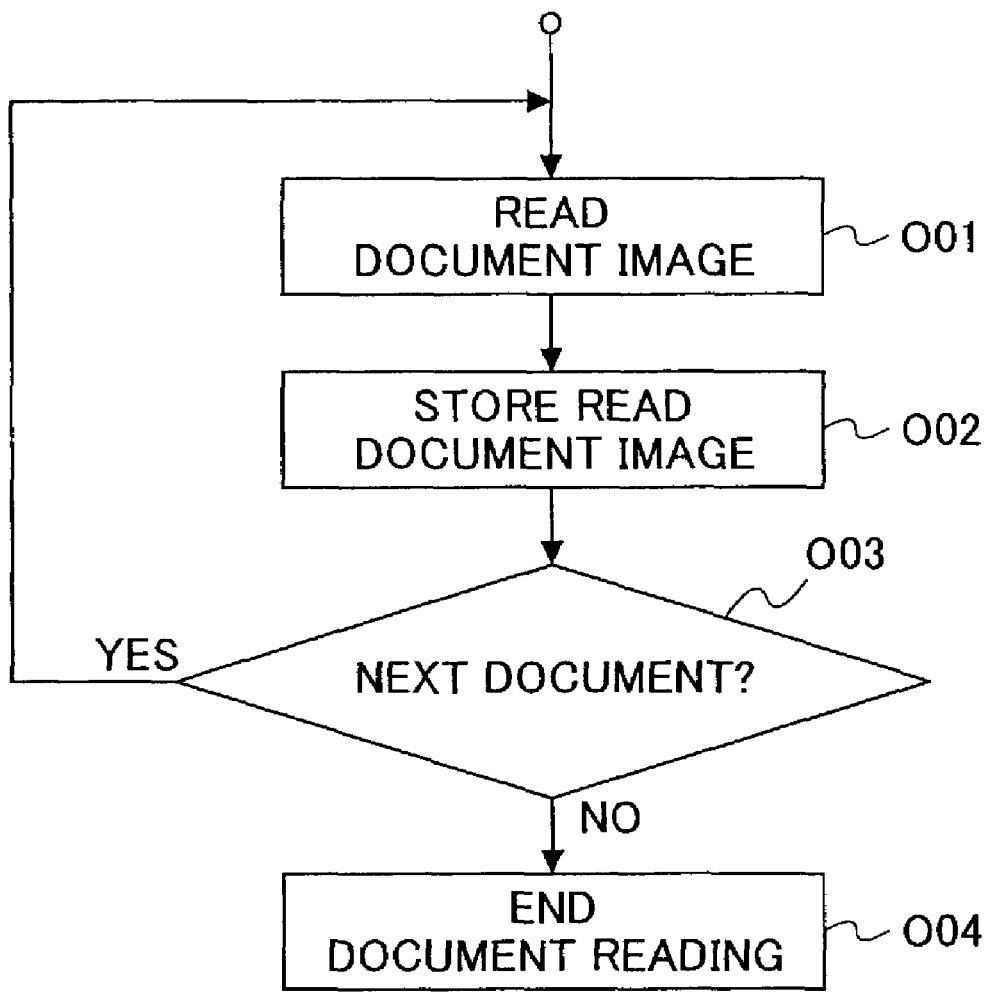
FIG. 25 is a flow chart for explaining a transmitting destination search process for searching a transmitting destination requiring low communication expenses.

The step N01 checks whether or not a plurality of transmitting destination information is stored in the RAM 4113, and the process advances to a transmitting destination search process O shown in FIG. 25 if the decision result in the step N01 is NO. If the decision result in the step N01 is YES, the step N02 checks whether or not a line (non-accounting target line) which is not a target of a charge per unit time is included in the transmitting destination information N1 through Nk. The non-accounting target line includes an extension number, dial-free number (public telephone number), a LAN line address (mail address) and the like.

If the decision result in the step N02 is YES, the step N03 sets the transmitting destination information including the non-accounting target line as the first transmitting destination, and the process advances to a broadcast transmission process P shown in FIG. 26. On the other hand, if the decision result in the step N02 is NO, the step N04 checks whether or not the transmitting destination information N1 through Nk includes a telephone number having a local number (area code) identical to the local number (area code) of the telephone line of the facsimile apparatus 3.

If the decision result in the step N04 is YES, the step N05 sets the transmitting destination information including the identical local number as the first transmitting destination, and the process advances to the broadcast transmission process P shown in FIG. 26. On the other hand, if the decision result in the step N04 is NO, the step N06 checks whether or not the transmitting destination information N1 through Nk includes a local number (area code) of a domestic telephone line.

If the decision result in the step N06 is YES, the step N07 sets the transmitting destination information including the local number of the domestic telephone line as the first transmitting destination, and the process advances to the broadcast transmission process P shown in FIG. 26. On the other hand, if the decision result in the step N06 is NO, the step N08 arbitrarily determines the first transmitting destination, and the process advances to the broadcast transmission process P shown in FIG. 26.

FIG. 25 is a flow chart for explaining the transmitting destination search process O for searching a transmitting destination requiring low communication expenses. The transmitting destination search process O includes steps O01 through O04 shown in FIG. 25.

In FIG. 25, the step O01 reads the document which is set in the scanner 401. The step O02 compresses the read image data of the document and stores the compressed image data in the image memory 413. The step O03 checks whether or not a next document exists, and the process returns to the step O01 if the decision result in the step O03 is YES. On the other hand, the step O04 ends the document reading process. Hence, the image data of the document is stored in the image memory 413 for all pages of the document which is set in the scanner 401.

FIG. 26 is a flow chart for explaining the broadcast transmission process P. The broadcast transmission process P includes steps P01 through P14 shown in FIG. 26.

In FIG. 26, the step P01 judges the type of line of the first transmitting destination which is determined by the transmitting destination search process O shown in FIG. 25. That is, the step P01 judges whether the line is a telephone number or a mail address. Then, the system control unit 411 checks whether or not the transmitting destination information is a telephone number, in the step P02. If the transmitting destination information is a telephone line (facsimile transmission) and the decision result in the step P02 is YES, the step P03 checks whether or not the line (hereinafter referred to as a first line) of the first NCU 406 is vacant. If the decision result in the step P04 is NO, the step P04 checks whether or not the line (hereinafter referred to as a second line) of the second NCU 409 is vacant. The process returns to the step P01 if the decision result in the step P04 is NO.

If the transmitting destination information is not a telephone line (not a facsimile transmission) and the decision result in the step P02 is NO, the step P05 checks whether or not a line of the LAN unit 410 is vacant. The process returns to the step P01 if the decision result in the step P05 is NO.

The process advances to the step P06 if the decision result in one of the steps P03, P04 and P05 is YES. The system control unit 411 reads the transmitting destination information from the RAM 4113 in the step P06. The step P07 checks whether or not the read transmitting destination information relates to the first transmitting destination. If the decision result in the step P07 is YES, the step P08 makes a connection to this first transmitting destination, and the step P09 transmits the image data read from the image memory 413 to this first transmitting destination. The step P010 checks whether or not the document reading process of the scanner 401 ended, and the process returns to the step P01 if the decision result in the step P010 is YES.

On the other hand, if the decision result in the step P07 is NO, the step P11 makes a connection to a corresponding transmitting destination, and the step P12 transmits the image data read from the image memory 413 to this corresponding transmitting destination. The step P13 checks whether or not the transmission is started with respect to all transmitting destinations. The process returns to the step P01 if the decision result in the step P13 is NO. If the decision result in the step P13 is YES, the step P14 checks whether or not the transmission to all transmitting destinations ended, and the process ends if the decision result in the step P14 is YES.

Further, the present invention is not limited to these embodiments, but various variations and modifications may be made without departing from the scope of the present invention.

What is claimed is:

1. A multiple-line facsimile apparatus which accommodates a plurality of communication lines including one or a plurality of telephone lines and local area network lines, said multiple-line facsimile apparatus comprising:

an image reader configured to read a document image;

an image data storage configured to store image data of the document image read by the image reader;

an input unit configured to input a plurality of transmitting destinations;

an inexpensive transmitting destination searching unit configured to search for an arbitrary transmitting destination requiring an arbitrary low communication charge per unit time from amongst the plurality of transmitting destinations input from the input unit;

a communication control unit configured to transmit image data only to the arbitrary transmitting destination via a single communication line used by the arbitrary transmitting destination in response to a transmission start instruction, as pages of the document image are successively read by the image reader, in parallel with reading of the document image by the image reader and storing of the image data of the read document image to the image data storage, even if a plurality of communication lines are vacant, wherein the communication control unit transmits image data amounting to all pages of the document image stored in the image data storage, by a broadcast transmission to remaining transmitting destinations other than said arbitrary transmitting destination via remaining vacant communication lines other than the single communication line when the reading of the image data amounting to all pages of the document image is completed by the image reader, and if the image data transmission is not made with respect to all remaining transmitting destinations by the broadcast transmission, transmits the image data amounting to all pages of the document and stored in the image data storage to a remaining transmitting destination to which the image data transmission has not been made, when one of the plurality of communication lines, including the single communication line, becomes vacant.

2. The multiple-line facsimile apparatus as claimed in claim 1, wherein said inexpensive transmitting destination searching unit searches for said arbitrary transmitting destination requiring a minimum communication charge per unit time from amongst the plurality of transmitting destinations registered in the transmitting destination storage.

3. The multiple-line facsimile apparatus as claimed in claim 1, further comprising:
a local number storage configured to store local numbers of the plurality of transmitting destinations registered in the transmitting destination storage,
wherein said inexpensive transmitting destination searching unit searches for said arbitrary transmitting destination requiring said arbitrary low communication charge per unit time from amongst the plurality of transmitting destinations registered in the transmitting destination storage based on the local numbers stored in the local number storage.

4. The multiple-line facsimile apparatus as claimed in claim 1, further comprising:
a charge table configured to store communication charges per unit time with respect to the plurality of transmitting destinations registered in the transmitting destination storage,
wherein said inexpensive transmitting destination searching unit searches for said arbitrary transmitting destination requiring said arbitrary low communication charge per unit time from amongst the plurality of transmitting destinations registered in the transmitting destination storage based on the communication charges per unit time stored in the charge table.

5. The multiple-line facsimile apparatus as claimed in claim 1, wherein said inexpensive transmitting destination searching unit searches for said arbitrary transmitting destination requiring said arbitrary low communication charge per unit time from amongst the plurality of transmitting destinations registered in the transmitting destination storage based on whether the transmitting destination is identified by a telephone number of a mail address.

6. The multiple-line facsimile apparatus as claimed in claim 1, wherein said communication control unit controls the data communication unit to start broadcasting the image data stored in the image data storage to said remaining transmitting destinations via the vacant lines.

7. The multiple-line facsimile apparatus as claimed in claim 1, wherein said transmitting destination storage registers transmitting destination information of the plurality of transmitting destinations, including telephone numbers or network addresses of the plurality of transmitting destinations.

8. The multiple-line facsimile apparatus of claim 1, wherein said inexpensive transmitting destination searching unit searches for the arbitrary transmitting destination, after an instruction is received to start transmission of the image data to the plurality of transmitting destinations registered in the transmitting destination storage.

9. The multiple-line facsimile apparatus of claim 1, wherein the image data are transmitted only to the arbitrary transmitting destination via the single vacant communication line until the reading of the document image by the image reader ends, even if the remaining communication lines are vacant.

10. The multiple-line facsimile apparatus of claim 1, wherein the image data are simultaneously transmitted to the remaining transmitting destinations via the vacant communications lines by the broadcast transmission.

11. The multiple-line facsimile apparatus of claim 1, wherein the transmission to the arbitrary transmitting destination is performed as the pages of the document image are successively read by the image reader, and transmission to each of the remaining transmitting destinations is performed by the broadcast transmission after the reading of the image data amounting to said all pages of the document image is completed by the image reader.

12. The multiple-line facsimile apparatus of claim 1, wherein the image data amounting to said all pages of the document image are transmitted to each of the remaining transmitting destinations by the broadcast transmission as soon as one communication line becomes vacant amongst all of the communication lines, including the single communication line used for the transmission to the arbitrary transmitting destination.

13. A data communication method for a multiple-line facsimile apparatus which accommodates a plurality of communication lines including one or a plurality of telephone lines and local area network lines, said data communication method comprising:
an image reading step reading a document image by an image reader;
an inexpensive transmitting destination searching step searching for an arbitrary transmitting destination requiring an arbitrary low communication charge per unit time from amongst the plurality of transmitting destinations;
a communication control step controlling communications to transmit image data only to the arbitrary transmitting destination via a single communication line used by the arbitrary transmitting destination in response to a transmission start instruction, as pages of the document image are successively read by the image reader, in parallel with reading of the document image by the image reader and storing of the image data of the read document image to an image data storage, even if a plurality of communication lines are vacant,
wherein the communication control step controls the communications to transmit image data amounting to all pages of the document image, by a broadcast transmission to remaining transmitting destinations other than said arbitrary transmitting destination via remaining vacant communication lines other than the single communication line when the reading of the image data amounting to all pages of the document image is completed by the image reader, and if the image data transmission is not made with respect to all remaining transmitting destinations by the broadcast transmission, transmit the image data amounting to all pages of the document and stored in the image data storage to a remaining transmitting destination to which the image data transmission has not been made, when one of the plurality of communication lines, including the single communication line, becomes vacant.

14. The data communication method as claimed in claim 13, wherein said inexpensive transmitting destination searching step searches for said arbitrary transmitting destination requiring a minimum communication charge per unit time from among the plurality of transmitting destinations registered in the transmitting destination storage.

15. The data communication method as claimed in claim 13, wherein said inexpensive transmitting destination searching step searches for said arbitrary transmitting destination requiring said arbitrary low communication charge per unit time from among the plurality of transmitting destinations registered in the transmitting destination storage based on local numbers of said plurality of transmitting destinations stored in a local number storage.

16. The data communication method as claimed in claim 13, wherein said inexpensive transmitting destination searching step searches for said arbitrary transmitting destination requiring said arbitrary low communication charge per unit time from among the plurality of transmitting destinations registered in the transmitting destination storage based on communication charges per unit time with respect to the plurality of transmitting destinations registered in the transmitting destination storage and stored in a charge table.

17. The data communication method as claimed in claim 6, wherein said inexpensive transmitting destination searching step searches for said arbitrary transmitting destination requiring said arbitrary low communication charge per unit time from among the plurality of transmitting destinations registered in the transmitting destination storage based on whether the transmitting destination is identified by a telephone number of a mail address.

18. The data communication method as claimed in claim 6, wherein said communication control step controls the data communication unit to start broadcasting the image data stored in the image data storage to said remaining transmitting destinations via the vacant lines.

19. The data communication method as claimed in claim 6, further comprising:
registering, in the transmitting destination storage, transmitting destination information of the plurality of transmitting destinations, including telephone numbers or network addresses of the plurality of transmitting destinations.

* * * * *